United States Patent
Pang et al.

(10) Patent No.: US 12,531,804 B2
(45) Date of Patent: Jan. 20, 2026

(54) ROUTE INFORMATION PROCESSING METHOD AND APPARATUS

(71) Applicant: Huawei Technologies Co., Ltd., Shenzhen (CN)

(72) Inventors: Donglei Pang, Beijing (CN); Haibo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 18/496,483

(22) Filed: Oct. 27, 2023

(65) Prior Publication Data

US 2024/0064094 A1 Feb. 22, 2024

Related U.S. Application Data

(63) Continuation of application No. PCT/CN2022/089141, filed on Apr. 26, 2022.

(30) Foreign Application Priority Data

Apr. 30, 2021 (CN) .......................... 202110485519.3
May 31, 2021 (CN) .......................... 202110603342.2

(51) Int. Cl.
*H04L 45/24* (2022.01)
*H04L 45/02* (2022.01)
*H04L 45/42* (2022.01)

(52) U.S. Cl.
CPC .............. *H04L 45/24* (2013.01); *H04L 45/02* (2013.01); *H04L 45/42* (2013.01)

(58) Field of Classification Search
CPC ......... H04L 45/24; H04L 45/02; H04L 45/42; H04L 45/03; H04L 45/04; H04L 45/22; H04L 45/28; H04L 12/12; H04L 45/70
See application file for complete search history.

(56) References Cited

U.S. PATENT DOCUMENTS 7,080,161 B2 * 7/2006 Leddy .................. H04L 47/283
                709/239
7,778,248 B2 * 8/2010 Scudder ................. H04L 45/00
                370/465

(Continued)

FOREIGN PATENT DOCUMENTS

| CN | 101141382 A | 3/2008 |
|---|---|---|
| CN | 107566298 A | 1/2018 |
| WO | 2021077971 A1 | 4/2021 |

OTHER PUBLICATIONS

Patel Arrcus K et al:"BGP Link-State Shortest Path First (SPF) Routing draft-ietf-1svr-bgp-spf-13; draft-ietf-1svr-bgp-spf-13. txt", BGP Link-State Shortest Path First (SPF)Routing Drapt-IETF-LSVR-BGP-SPF-13; Draft-IETF-LSVR-BGP-SPF-13.TXT; Internet-Draft: Network Working Group, Internet. Engineering Task Force, IETF; Standardworki, No. 13 Feb. 22, 2021 (Feb. 22, 2021), pp. 1-37, XP. 015144623.

*Primary Examiner* — Oanh Duong
(74) *Attorney, Agent, or Firm* — Slater Matsil, LLP

(57) ABSTRACT

Embodiments of this application disclose a route information processing method and an apparatus, which may be used for a network device that supports a BGP protocol, to resolve a defect in an existing BGP SPF protocol. The network device may be a forwarding device, for example, a router or a switch. For example, in embodiments of this application, a priority attribute is introduced to route information that carries NLRI through an extended BGP protocol, to indicate a priority of the route information. This influences a BGP NLRI selection process performed by the network device. For example, embodiments of this application provide a network fault processing method, to help resolve a problem that a network device cannot calculate a packet forwarding path in some scenarios in an existing protocol.

20 Claims, 13 Drawing Sheets

(56) References Cited

U.S. PATENT DOCUMENTS

| | | | |
|---|---|---|---|
| 8,737,406 B1* | 5/2014 | Cavanaugh | H04L 45/033 |
| | | | 370/395.31 |
| 9,166,886 B1* | 10/2015 | Kabbani | H04L 43/0894 |
| 9,391,796 B1* | 7/2016 | Shekhar | H04L 49/357 |
| 9,432,280 B2* | 8/2016 | Kotalwar | H04L 45/16 |
| 10,097,449 B2* | 10/2018 | Patel | H04L 67/10 |
| 11,050,681 B2* | 6/2021 | Mukhopadhyay | H04L 45/42 |
| 11,356,369 B1* | 6/2022 | Loganathan | H04L 45/7453 |
| 2002/0141343 A1* | 10/2002 | Bays | H04L 41/0894 |
| | | | 370/235 |
| 2005/0135256 A1* | 6/2005 | Ball | H04L 45/04 |
| | | | 370/238 |
| 2013/0135992 A1* | 5/2013 | Callejo Rodriguez | |
| | | | H04L 41/0836 |
| | | | 370/236 |
| 2015/0117178 A1 | 4/2015 | Kotalwar | |
| 2015/0244628 A1* | 8/2015 | Gredler | H04L 47/724 |
| | | | 370/236 |
| 2021/0014148 A1 | 1/2021 | Heitz et al. | |
| 2021/0067463 A1* | 3/2021 | Mukhopadhyay | H04L 45/42 |
| 2021/0135980 A1* | 5/2021 | Pai | H04L 45/42 |
| 2021/0258249 A1* | 8/2021 | Torvi | H04L 45/566 |

* cited by examiner

ROUTE INFORMATION PROCESSING METHOD AND APPARATUS

CROSS-REFERENCE TO RELATED APPLICATIONS

This application is a continuation of International Application No. PCT/CN2022/089141, filed on Apr. 26, 2022, which claims priority to Chinese Patent Application No. 202110485519.3, filed on Apr. 30, 2021 and Chinese Patent Application No. 202110603342.2, filed on May 31, 2021. All of the aforementioned patent applications are hereby incorporated by reference in their entireties.

TECHNICAL FIELD

This application relates to the field of communication technologies, and in particular, to a route information processing method and an apparatus.

BACKGROUND

A main function of a border gateway protocol (BGP) is to exchange network layer reachability information (NLRI) between autonomous systems (ASs) that support the protocol.

After obtaining the NLRI through the BGP, a network device may perform packet forwarding path calculation based on the NLRI. For example, a shortest path first (SPF) algorithm may be used to perform path calculation. In this case, a packet forwarding path calculation method may be referred to as BGP SPF.

However, currently, some defects still exist in the BGP. In some network scenarios, there is a problem that a packet forwarding path cannot be calculated by using the BGP SPF.

SUMMARY

Embodiments of this application provide a route information processing method and an apparatus, to resolve a defect in an existing BGP SPF protocol.

According to a first aspect, an embodiment of this application provides a route information processing method. The method may be applied to a network that supports a BGP technology. It is assumed that the network includes a first network device, a second network device, and a third network device. The first network device is connected to the second network device through a first link. A border gateway protocol BGP neighbor relationship is established between the first network device and the second network device. A BGP neighbor relationship is established between the first network device and the third network device. In a possible implementation, network devices that establish a neighbor relationship with each other are directly connected to each other.

The following describes an embodiment method provided in the first aspect.

The first network device may receive first route information from the second network device, where the first route information includes first NLRI of a target network. The first NLRI may be node NLRI, link NLRI, topology prefix NLRI, or the like. Based on that the first network device detects that the second network device and the first network device are unreachable with each other, the first network device may send second information to the third network device. The second information may indicate the third network device to select third route information. The third route information is route information whose path (referred to as an advertisement path) advertised to the third network device does not pass through the first link. The third network device may calculate a route to the target network based on the selected third route information. In addition, the first network device may store the first NLRI in a local link database LSDB within first duration that is after sending the second information, to calculate a packet forwarding path (or referred to as a route) from the first network device to the target network.

After the first network device detects that the second network device and the first network device are unreachable with each other, the first network device may send the second information to the third network device, to indicate the third network device to select the third route information whose advertisement path does not pass through the first link. This helps the third network device calculate a packet forwarding path to the target network based on the first NLRI in the third route information. In addition, the first network device may store the first NLRI in the LSDB within the first duration, to calculate the packet forwarding path to the target network based on the first NLRI. Therefore, the defect in the existing BGP SPF protocol is resolved, and a problem that a network device cannot calculate a packet forwarding path to the target network in some network scenarios is reduced or avoided.

In a possible implementation, a manner in which the first network device detects that the second network device and the first network device are unreachable with each other may include but is not limited to: The first network device detects that a fault occurs on the second network device, or the first network device detects that a fault occurs on the first link, or the first network device detects that a fault occurs on a local port corresponding to the first link.

In a possible implementation, the third route information may include the first NLRI. Correspondingly, both the third route information and the first route information are route information generated by the target network, but advertisement paths of the third route information and the first route information are different from each other. This helps the third network device preferentially select route information that is generated by the target network and whose advertisement path does not pass through the first link, and further helps the third network device calculate the packet forwarding path to the target network based on the first NLRI in the third route information.

In a possible implementation, the second information includes the first NLRI. After the first network device receives the first route information from the second network device, and after the first network device detects that the second network device and the first network device are unreachable with each other, the first network device may obtain, from the first route information, NLRI (that is, the first NLRI) that may be affected by the fault, and then send, to the third network device, the second information that includes the first NLRI. This helps the third network device select another route information (that is, the third route information) whose advertisement path reaches the third network device, and further helps the third network device calculate the packet forwarding path to the target network based on the first NLRI in the third route information.

In a possible implementation, after the first network device sends the second information to the third network device, based on that the third network device receives the third route information and the third network device selects the third route information based on the second information, the third network device may send fourth route information to the first network device based on the third route information, where the fourth route information includes the first NLRI. It can be seen that the first network device sends the second information to the third network device, so that the first network device cannot only enable the third network device to select the third route information whose advertisement path does not pass through the first link, but also trigger the third network device to send, to the first network device based on the selected third route information, the fourth route information whose advertisement path does not pass through the first link. This helps the first network device calculate the packet forwarding path to the target network based on the first NLRI in the fourth route information.

In a possible implementation, after the first network device receives the fourth route information from the third network device, the first network device may select the fourth route information, to calculate the route to the target network. Then, the first network device may store, in the LSDB, the first NLRI in the fourth route information. The first network device selects the received fourth route information, and stores, in the LSDB, the first NLRI in the fourth route information. This helps the first network device calculate the packet forwarding path to the target network based on the first NLRI in the fourth route information.

In a possible implementation, the second information may be route information that is generated by the target network and whose advertisement path passes through the first link. For example, the second information may be sent by the first network device based on the first route information. After receiving the second information, the third network device may calculate the packet forwarding path (or referred to as a route) to the target network based on the first NLRI in the second information. In this embodiment of this application, the second information is not limited to being the $1^{st}$ piece of route information sent by the first network device to the third network device based on the first route information. For example, before the first network device sends the second information to the third network device, the first network device may send fifth route information to the third network device based on the first route information. In this case, after receiving the second information, the third network device may replace the locally stored fifth route information with the second information.

In a possible implementation, the second information further includes a second priority attribute, the third route information further includes a third priority attribute, the second priority attribute indicates a priority of the second information (or the first NLRI included in the second information), the third priority attribute indicates a priority of the third route information (or the first NLRI included in the third route information), and the priority indicated by the second information is lower than the priority indicated by the third route information. A priority attribute indicating a lower priority is included in the route information whose advertisement path passes through the first link, to help indicate the third network device to select the route information whose advertisement path does not pass through the first link.

In a possible implementation, the first route information further includes a first priority attribute, and the first priority attribute indicates a priority of the first route information (or the first NLRI included in the first route information). After the first network device detects that the second network device and the first network device are unreachable with each other, the first network device may send the second information to the third network device based on the first route information, where the priority indicated by the second information is lower than the priority indicated by the first route information. Before advertising the first route information to the third network device, the first network device may modify the priority attribute in the first route information, to reduce a priority of route information whose advertisement path passes through the first link, to help indicate the third network device to select the route information whose advertisement path does not pass through the first link.

In a possible implementation, based on that the first network device detects that the second network device and the first network device are unreachable with each other, the first network device may modify the first priority attribute in the locally stored first route information into the second priority attribute. Optionally, the first network device may send the second information to the third network device in response to the modification. For example, the first network device indicates, by using the second information, the third network device to update the previously received fifth route information to the second information.

In a possible implementation, based on that the second network device and the first network device are still unreachable with each other after the first duration elapses, the first network device may delete locally stored modified first route information (which includes the second priority attribute).

In a possible implementation, based on that reachability between the first network device and the second network device is restored within the first duration, the first network device may modify the second priority attribute in the locally stored first route information into the first priority attribute. To reduce network jitter, the first network device may not immediately restore the priority attribute in the first route information after detecting that the reachability is restored, but modify the second priority attribute in the locally stored first route information into the first priority attribute after specific duration (for example, second duration) elapses. A start moment of the second duration may correspond to a moment at which the first network device detects that the reachability between the first network device and the second network device is stored, or correspond to a moment at which the first duration elapses.

In a possible implementation, after the first network device receives the first route information, the first network device sends the fifth route information to the third network device based on the first route information. The second information may be for withdrawing the fifth route information from the third network device. For example, optionally, the second information is included in a withdrawal field of a BGP packet, and the second information includes the first NLRI, to indicate the third network device to delete route information (that is, the fifth route information) that is received from the first network device and that includes the first NLRI.

In a possible implementation, after the first network device detects that the second network device and the first network device are unreachable with each other, the first network device may delete the locally stored first route information. Optionally, the first network device may send the second information to the third network device in response to deleting the locally stored (for example, in an input route information database) first route information. After the first network device deletes the locally stored first route information, if the first network device receives the fourth route information, the first network device may select the fourth route information, and store, in a local LSDB, the first NLRI in the fourth route information.

The solutions provided in the claims and the first aspect of the summary of this application are specifically described in embodiments corresponding to FIG. 8 to FIG. 11 in the description of embodiments. Details are not described herein.

According to a second aspect, an embodiment of this application provides a route information processing method. The method may be applied to a network that supports a BGP technology. It is assumed that the network includes a first network device, a second network device, a third network device, and a fourth network device. The first network device is connected to the second network device through a first link. A border gateway protocol BGP neighbor relationship is established between the first network device and the second network device. A BGP neighbor relationship is established between the first network device and the third network device. A BGP neighbor relationship is established between the third network device and the fourth network device. In a possible implementation, network devices that establish a neighbor relationship with each other are directly connected to each other.

The following describes an embodiment method provided in the second aspect.

The third network device may receive second information and third route information respectively from the first network device and the fourth network device. A path (referred to as an advertisement path) of the third route information that is advertised to the third network device does not pass through the first link. The second information may indicate the third network device to select the third route information. The third network device may select the third route information based on the second information.

In a possible implementation, the third route information includes first NLRI corresponding to the network.

In a possible implementation, the second information includes the first NLRI.

In a possible implementation, the second information is sent by the first network device when the first network device detects that second network device and the first network device are unreachable with each other. The second network device layer sends first route information to the first network device. The first route information includes the first NLRI corresponding to a target network. The third network device selects the third route information based on the second information, to help calculate a packet forwarding path to the target network based on the first NLRI in the third route information.

In a possible implementation, after selecting the third route information, the third network device may send fourth route information to first network device based on the third route information. The fourth route information includes the first NLRI.

In a possible implementation, the second information further includes a second priority attribute, the third route information further includes a third priority attribute, the second priority attribute indicates a priority of the second information, the third priority attribute indicates a priority of the third route information, and the priority indicated by the second information is lower than the priority indicated by the third route information.

In a possible implementation, the third network device selects the third route information from the second information and the third route information based on the second priority attribute and the third priority attribute.

In a possible implementation, before the third network device receives the second information, the third network device further receives fifth route information from the first network device, where the fifth route information includes the first NLRI.

In a possible implementation, the second information is for withdrawing the fifth route information from the third network device. After receiving the second information, the third network device may delete the locally stored fifth route information based on the second information.

The first network device, the second network device, and the third network device involved in the second aspect correspond to the corresponding network devices involved in the first aspect. For understanding of steps performed by the first network device, the second network device, and the third network device and beneficial effects in the second aspect, refer to the steps performed by the corresponding network devices and beneficial effects in the first aspect. Details are not described herein again.

According to a third aspect, an embodiment of this application further provides another route information processing method. The method is applicable to a network that supports an extended BGP protocol. The network includes a first network device, a second network device, and a third network device. The first network device is connected to the second network device through a first link. A border gateway protocol BGP neighbor relationship is established between the first network device and the second network device. A BGP neighbor relationship is established between the second network device and the third network device. In a possible implementation, network devices that establish a neighbor relationship with each other are directly connected to each other.

The extended BGP protocol mainly features extension that is based on an existing BGP protocol in the following two aspects.

(1) A priority attribute is included in route information. For example, an extended community (extended community) attribute is added in a path attribute field of the route information. The priority attribute indicates a priority of the route information (or NLRI included in the route information).

(2) A selection rule (referred to as a priority selection rule) related to the priority attribute is added to selection rules in a BGP NLRI selection process. For example, the priority selection rule may include preferentially selecting route information with a higher priority indicated by a priority attribute.

The following describes an embodiment method provided in the third aspect.

The first network device sends first route information to the second network device. The first route information includes first NLRI and a first priority attribute. The first priority attribute indicates a priority of the first route information. The first priority attribute indicates the second network device to select eligible route information from the first route information and second route information. The second route information is route information sent by the third network device to the second network device. The second route information includes the first NLRI and a second priority attribute. The second priority attribute indicates a priority of the second route information. The eligible route information is route information with a higher priority in the first route information and the second route information.

It can be seen that route information with a priority attribute may be advertised between network devices. The priority attribute may be used as a rule for selecting NLRI. This helps control a process of selecting the NLRI by the network devices.

In a possible implementation, a network device corresponding to the eligible route information is a network device with a smaller BGP identifier (identifier) in the first network device and the third network device.

In a possible implementation, a value of a priority attribute in the eligible route information is greater than a value of a priority attribute in ineligible route information, and the ineligible route information is route information that is in the first route information and the second route information and that is not selected by the first network device.

In a possible implementation, the network device may modify a priority attribute in selected route information before advertising the selected route information.

In a possible implementation, before the first network device sends the first route information to the second network device, the first network device receives third route information from a fourth network device. A BGP neighbor relationship is established between the fourth network device and the first network device. It is assumed that the first network device is connected to the second network device through the first link, and the neighbor relationship is established between the first network device and the second network device. The third route information includes the first NLRI and a third priority attribute. The third priority attribute indicates a priority of the third route information.

In a possible implementation, the first route information is obtained through modifying the third route information by the first network device. The third priority attribute is different from the first priority attribute.

In a possible implementation, after the first network device receives the third route information from the fourth network device, and before the first network device sends the first route information to the second network device, the first network device may modify the third priority attribute in the third route information into the first priority attribute in response to that the first network device detects that the fourth network device and the first network device are unreachable with each other. The priority determined by the first priority attribute is lower than the priority determined by the third priority attribute.

It can be seen that, after the first network device receives the third route information from the fourth network device, if the first network device detects that the fourth network device and the first network device are unreachable with each other, the first network device may reduce the priority of the third route information, and then choose to advertise modified route information to the second network device. This helps the second network device preferentially select route information that is generated by a target network and whose advertisement path does not pass through the first link, and further helps the second network device calculate a packet forwarding path to the target network.

In a possible implementation, after the first network device sends the first route information to the second network device, based on that the second network device receives the second route information and the second network device selects the second route information based on the first route information, the second network device may send fourth route information to the first network device based on the second route information. The fourth route information includes the first NLRI.

It can be seen that the first network device sends the first route information to the second network device, so that the first network device cannot only enable the second network device to select the second route information whose advertisement path does not pass through the first link, but also trigger the second network device to send, to the first network device based on the selected second route information, the fourth route information whose advertisement path does not pass through the first link. This helps the first network device calculate the packet forwarding path to the target network based on the first NLRI in the fourth route information.

In a possible implementation, after the first network device receives the fourth route information from the second network device, the first network device may select the fourth route information. Then, the first network device may store, in an LSDB, the first NLRI in the fourth route information. The first network device selects the received fourth route information, and stores, in the LSDB, the first NLRI in the fourth route information. This helps the first network device calculate the packet forwarding path to the target network based on the first NLRI in the fourth route information.

According to a fourth aspect, an embodiment of this application provides another route information processing method. The method may be applied to a network that supports an extended BGP technology. It is assumed that the network includes a first network device, a second network device, and a third network device. The first network device is connected to the second network device through a first link. A border gateway protocol BGP neighbor relationship is established between the first network device and the second network device. A BGP neighbor relationship is established between the second network device and the third network device. In a possible implementation, network devices that establish a neighbor relationship with each other are directly connected to each other.

The following describes an embodiment method provided in the fourth aspect.

The second network device receives first route information and second route information respectively from the first network device and the third network device. The first route information includes first NLRI and a first priority attribute. The second route information includes the first NLRI and a second priority attribute. The first priority attribute and the second priority attribute respectively indicate priorities of corresponding route information. The second network device selects eligible route information from the first route information and the second route information based on the second priority attribute and the first priority attribute. The eligible route information is route information with a higher priority in the second route information and the first route information.

In a possible implementation, a network device corresponding to the eligible route information is a network device with a smaller BGP identifier (identifier) in the first network device and the third network device.

In a possible implementation, a value of a priority attribute in the eligible route information is greater than a value of a priority attribute in ineligible route information, and the ineligible route information is route information that is in the first route information and the second route information and that is not selected by the first network device.

In a possible implementation, before the first network device sends the first route information to the second network device, the first network device sends fifth route information to the second network device, where the fifth route information includes the first NLRI. The fifth route information includes the first NLRI and a third priority attribute, and the third priority attribute indicates a priority of the fifth route information.

In a possible implementation, the third priority attribute is different from the first priority attribute.

In a possible implementation, the priority determined by the first priority attribute is lower than the priority determined by the third priority attribute.

In a possible implementation, after receiving the first route information, the second network device may replace the locally stored fifth route information with the first route information.

In a possible implementation, after the first network device sends the first route information to the second network device, based on that the second network device receives the second route information, the second network device may select second route information with a higher priority from the first route information and the second route information based on the first priority attribute and the second priority attribute. Then, the second network device may send fourth route information to the first network device based on the second route information. The fourth route information includes the first NLRI.

The first network device, the second network device, and the third network device involved in the fourth aspect correspond to the corresponding network devices involved in the third aspect. For understanding of steps performed by the first network device, the second network device, and the third network device and beneficial effects in the fourth aspect, refer to steps performed by the corresponding network devices and beneficial effects in the third aspect. Details are not described herein again.

The solutions provided in the third aspect and the fourth aspect in the summary of this application are specifically described in embodiments corresponding to FIG. 5 and FIG. 6 in the description of embodiments. Details are not described herein.

According to a fifth aspect, an embodiment of this application provides a network device. The network device may be a physical network device, or may be an apparatus in a physical network device, or may be an apparatus that is compatible with a physical network device. Alternatively, the network device may be a virtual network device, for example, a virtual switch or a virtual router.

In a design, the network device may include a one-to-one corresponding module for performing the method/operation/step/action described in the first aspect, the second aspect, the third aspect, or the fourth aspect. The module may be a hardware circuit, or may be software, or may be implemented by a hardware circuit in combination with software.

According to a sixth aspect, an embodiment of this application provides a network device. The network device includes a processor and a memory. The memory is configured to store instructions. The memory is coupled to the processor. When executing the instructions stored in the memory, the processor may implement the method described in the first aspect, the second aspect, the third aspect, or the fourth aspect. The communication apparatus may further include a communication interface. The communication interface is configured for the apparatus to communicate with another device. For example, the communication interface may be a transceiver, a circuit, a bus, a module, a pin, or another type of communication interface, and the another device may be a terminal device.

According to a seventh aspect, an embodiment of this application provides a chip system. The chip system includes a processor, and may further include a memory, configured to implement the method described in the first aspect, the second aspect, the third aspect, or the fourth aspect. The chip system may include a chip, or may include a chip and another discrete component.

According to an eighth aspect, an embodiment of this application provides a computer-readable storage medium. The computer-readable storage medium includes instructions. When the instructions are run on a computer, the computer is enabled to perform the method according to any one of the possible implementations of the first aspect, the second aspect, the third aspect, or the fourth aspect of embodiments of this application.

According to a ninth aspect, an embodiment of this application provides a computer program product. The computer program product includes instructions. When the instructions are run on a computer, the computer is enabled to perform the method according to any one of the possible implementations of the first aspect, the second aspect, the third aspect, or the fourth aspect of embodiments of this application.

According to a tenth aspect, an embodiment of this application provides a network (or referred to as a communication system) including the first network device, the second network device, and the third network device in the method described in the first aspect, the second aspect, the third aspect, or the fourth aspect. In a possible implementation, the network may further include the fourth network device in the method described in the first aspect, the second aspect, the third aspect, or the fourth aspect.

DETAILED DESCRIPTION OF ILLUSTRATIVE EMBODIMENTS

Figure 1:
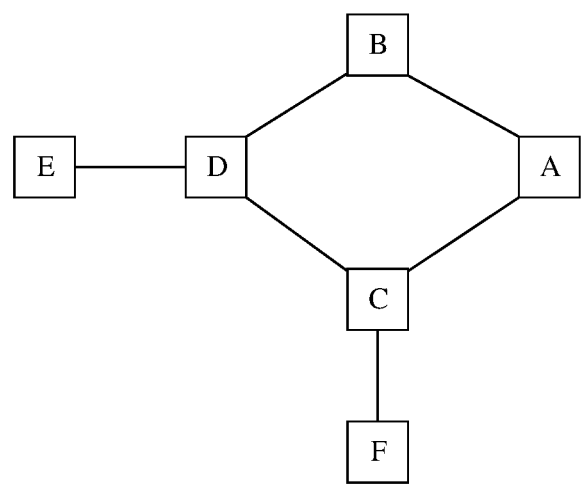
FIG. 1 shows a possible network to which an embodiment of this application is applicable.

The following describes technical solutions in embodiments of this application with reference to accompanying drawings Embodiments of this application are applicable to a network that supports a BGP technology. The network includes a plurality of network devices, and a BGP neighbor relationship (a neighbor relationship for short) may be established between different network devices. In a possible implementation, network devices that establish a neighbor relationship with each other are directly connected to each other. FIG. 1 shows a possible network to which an embodiment of this application is applicable. Refer to FIG. 1. The network includes a network device A, a network device B, a network device C, a network device D, a network device E, and a network device F. In FIG. 1, a connection line between network devices indicates a neighbor relationship between the network devices. For example, the network device C separately establishes a neighbor relationship with the network device D, the network device F, and the network device A.

In embodiments of this application, a network device (for example, any network device shown in FIG. 1) may be a forwarding device that supports a BGP technology. The forwarding device may be a switch, a router, or another device or network element that supports packet or data forwarding. In a possible implementation, the network device may be a physical entity in a network or an apparatus (for example, a chip or a functional module) in a physical entity. Alternatively, in a possible implementation, the network device may be a virtual device (for example, a virtual machine or container) running in a physical entity. For example, the virtual device may be a virtual router, a virtual switch, or the like.

FIG. 1 is merely an example of the network that supports the BGP technology. An applicable network is not limited to ring networking shown in FIG. 1 in this embodiment of this application, and a quantity of network devices in the applicable network is not limited. The applicable network in this embodiment of this application may use another networking form, or may include more or fewer network devices.

A main function of a BGP is to exchange NLRI between a plurality of network devices in the network that supports the protocol. In a possible implementation, the NLRI is node NLRI, link NLRI, or topology prefix NLRI. The topology prefix NLRI may be internet protocol version 4 (IPv4) topology prefix NLRI or internet protocol version 6 (IPv6) topology prefix NLRI.

A network device may receive a BGP packet (for example, an update packet or an update message) from another network device (a BGP neighbor for short) that establishes a neighbor relationship with the network device. The BGP packet may include BGP route information (route information for short), and the route information may include new NLRI or changed NLRI. Alternatively, the BGP packet may include withdrawal information. The withdrawal information includes NLRI, and is for withdrawing BGP route information that is sent previously and that includes the NLRI. Then, the network device may perform a selection process (for example, referred to as a BGP NLRI selection process) on the received route information with same NLRI, to select eligible route information. Then, the network device may continue to advertise the selected route information to the BGP neighbor, and store, in a link state database (LSDB), the NLRI and the like in the selected route information. The LSDB is for calculating a packet forwarding path. After storing the NLRI in the LSDB, the network device may calculate, based on the NLRI, a packet forwarding path to a target network corresponding to the NLRI.

In a possible implementation, the route information includes an NLRI field and a path attribute field (path attributes field). Optionally, the NLRI mentioned in this embodiment of this application may be an NLRI prefix in the NLRI field. The path attribute field may include one or more attributes. Before continuing to advertise the selected route information, the network device may modify an attribute in the selected route information, and then send modified route information to the BGP neighbor. For example, to resolve a route loop problem, the path attribute field may include an autonomous system (AS) path (AS_path) attribute, and the AS_path attribute may indicate an advertisement path of route information. Before continuing to advertise the selected route information, the network device may add a local AS identifier (for example, an AS number) to the AS_path attribute in the selected route information, and then send the modified route information to the BGP neighbor.

Before advertising the selected route information to the BGP neighbor, the network device usually modifies the attribute in the route information, for example, adds the local AS identifier to the AS_path attribute. Therefore, it is assumed that the network device selects route information 1, in this embodiment of this application, the network device advertises the selected route information 1 to the BGP neighbor, and the network device sends route information 2 to the BGP neighbor based on the selected route information 1. The route information 1 and the route information 2 include the same NLRI (or NLRI prefix) in the NLRI field.

As mentioned above, the network device may store, in the LSDB, the NLRI and the like in the selected route information. "NLRI and the like" means that, in this embodiment of this application, the network device is not limited to storing, in the LSDB, only the NLRI in the selected route information. Optionally, the network device may further store, in the LSDB, other information in the selected route information in association with the NLRI. For example, one or more attributes in the path attribute field may be associated with the NLRI and stored in the LSDB.

In addition to the LSDB mentioned above, a local database of the network device usually includes an input route information database and a local route information database. The input route information database may be an Adj-RIB-In (RIBin for short), and the RIBin stores route information received from a BGP neighbor. The local route information database may be a Loc-RIB (RIB-L for short), and the RIB-L stores route information selected by the network device in a selection process.

Figure 2:
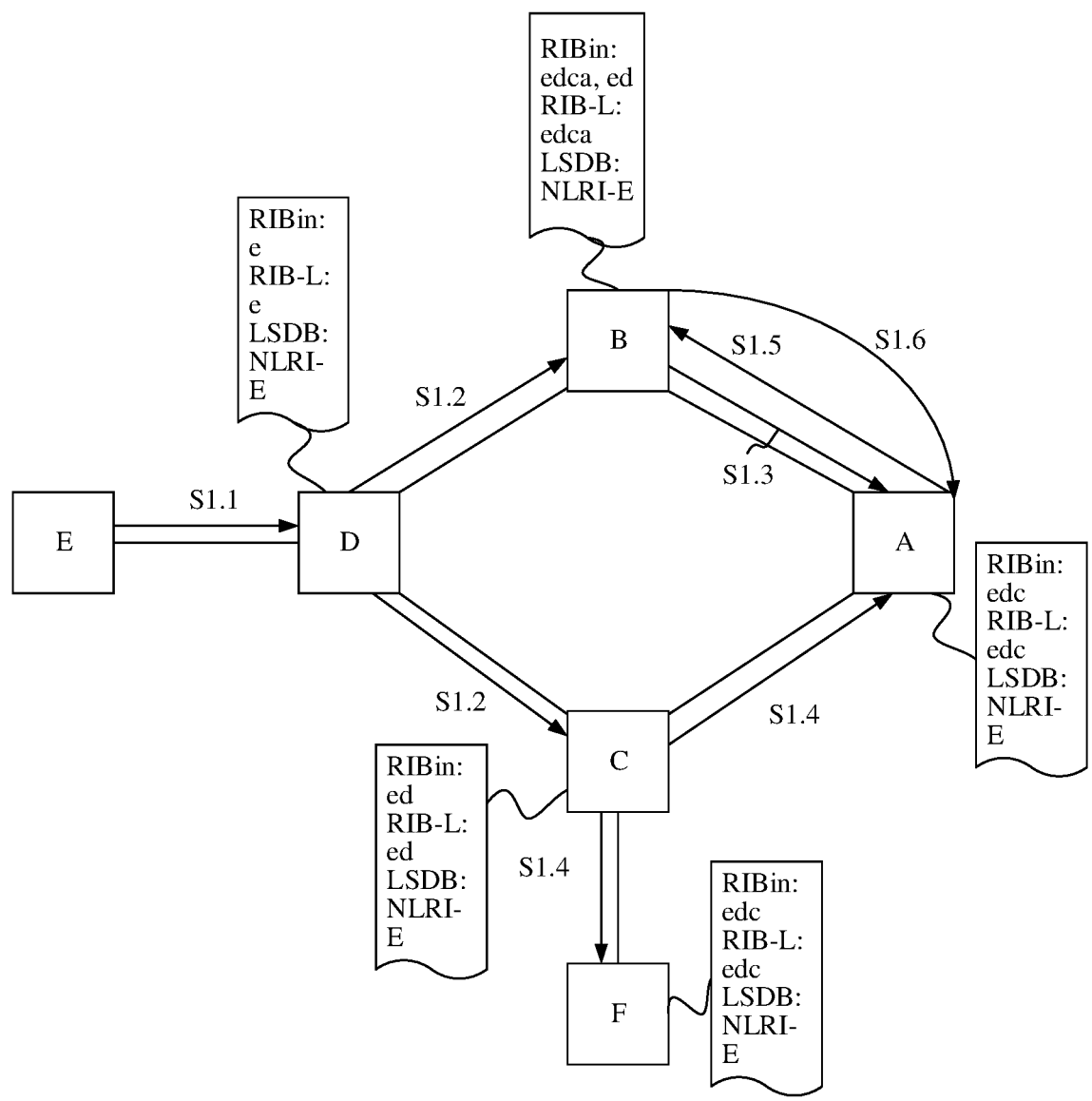
FIG. 2 shows a process of exchanging NLRI between network devices in a network shown in FIG. 1.

Based on the network shown in FIG. 1, the following describes a process of exchanging NLRI between network devices with reference to FIG. 2.

A network shown in FIG. 2 is the same as the network shown in FIG. 1. Compared with FIG. 1, in FIG. 2, line segments with arrows are added to indicate the process of exchanging the NLRI between the network devices. The following describes processes corresponding to line segments with arrows.

S1.1. A network device E may send route information e (e for short) to a network device D, where e includes NLRI (referred to as NLRI-E) of the network device E. The NLRI-E may be for calculating a packet forwarding path to the network device E. For example, the NLRI-E may include an internet protocol (IP) address of the network device E.

S1.2. After receiving e from the network device E, the network device D may store e in a local input route information base (for example, a RIBin). The network device D may select e and store e in a local route information base (for example, a RIB-L). Then, the network device D may separately advertise e to a network device B and a network device C, and store, in a local LSDB, the NLRI-E and the like in the selected e. Before advertising the selected e, the network device D usually modifies an attribute in e, for example, adds a local AS identifier to the AS_path attribute. Therefore, in this embodiment of this application, the route information sent by the network device D to the network device B and the network device C based on the selected e is referred to as route information ed (ed for short).

S1.3. After receiving ed from the network device D, the network device B may store ed in a local RIBin. The network device B may select ed and store ed in a RIB-L. Then, the network device B may choose to advertise ed to a network device A, and store, in a local LSDB, the NLRI-E and the like in the selected ed. Based on a reason similar to that described in S1.2, in this embodiment of this application, the route information sent by the network device B to the network device A based on the selected ed is referred to as route information edb (edb for short).

S1.4. After receiving ed from the network device D, the network device C may store the route information in a local RIBin. The network device C may select ed and store ed in a RIB-L. Then, the network device C may choose to separately advertise ed to the network device A and a network device F, and store, in a local LSDB, the NLRI-E and the like in the selected ed. Based on a reason similar to that described in S1.2, in this embodiment of this application, ed that is selected by the network device C and that is advertised to the network device A is referred to as route information edc (edc for short).

After receiving edc from the network device C, the network device F may store edc in a local input route information base. The network device F may select edc and store edc in a RIB-L. Then, the network device F may store, in a local LSDB, the NLRI-E and the like in the selected edc.

S1.5. After receiving edb and edc respectively from the network device B and the network device C, the network device A may store edb and edc in a local RIBin. Then, the network device A may perform the BGP NLRI selection process on edb and edc that are in the RIBin.

Currently, selection rules for the BGP NLRI selection process include: preferentially selecting route information received from a network device with a larger BGP identifier (identifier). For ease of description, the selection rule is referred to as a BGP identifier selection rule.

It is assumed that the network devices shown in FIG. 2 are sequentially the network device A, the network device C, the network device B, and the network device D in descending order of BGP identifiers. In this case, the network device A may select edc as eligible route information according to the BGP identifier selection rule, and store edc in a local RIB-L.

Then, the network device A may choose to advertise edc to the network device B, and store, in a local LSDB, the NLRI-E and the like in the selected route information edc. Based on a reason similar to that described in S1.2, in this embodiment of this application, the route information sent by the network device A to the network device B based on the selected edc is referred to as route information edca (edca for short).

S1.6. After receiving edca from the network device A, the network device B may store edca in the local RIBin. Then, the network device B may perform the BGP NLRI selection process on edca and ed that are in the RIBin. Based on assumption of a BGP identifier size of each network device in step S1.5, the network device B may select edca as eligible route information according to the BGP identifier selection rule, and replace ed in a local RIB-L with edca.

Then, the network device B may choose to advertise edca to the network device D. Based on a reason similar to that described in S1.2, in this embodiment of this application, edca that is selected by the network device B and that is advertised to the network device D is referred to as route information edcab (edcab for short). The network device D views an AS_path attribute in edcab and discards edcab through loop detection.

In addition, the network device B may send withdrawal information edb' (edb' for short) to the network device A, to withdraw the previously sent edb. In a possible implementation, edb' may be information in a withdrawal field of a BGP packet. The network device B may indicate the network device A to delete edb in the local RIBin by writing the NLRI-E of edb into the withdrawal field of the BGP packet.

After the network device A deletes edb in the local RIBin, the NLRI-E stored in the network device shown in FIG. 2 converges. In this case, information in the local RIBin, RIB-L, and LSDB in network devices other than the network device E is, for example, content in a corresponding text box shown in FIG. 2. FIG. 2 shows only information related to an advertisement process of the foregoing NLRI-E in the RIBin, the RIB-L, and the LSDB. Other information may be further included in the RIBin, the RIB-L, and the LSDB. It can be seen from the content of the text box in FIG. 2 that, in the NLRI exchange process between the network devices shown in FIG. 2, the NLRI-E released by the network device E is stored in the LSDB, and a packet forwarding path to the network device E may be calculated based on the NLRI-E in the LSDB.

In this embodiment of this application, the network devices may send route information to each other by using update messages.

However, currently, some defects still exist in the BGP. In some network scenarios, a problem that a packet forwarding path cannot be calculated exists.

Figure 3:
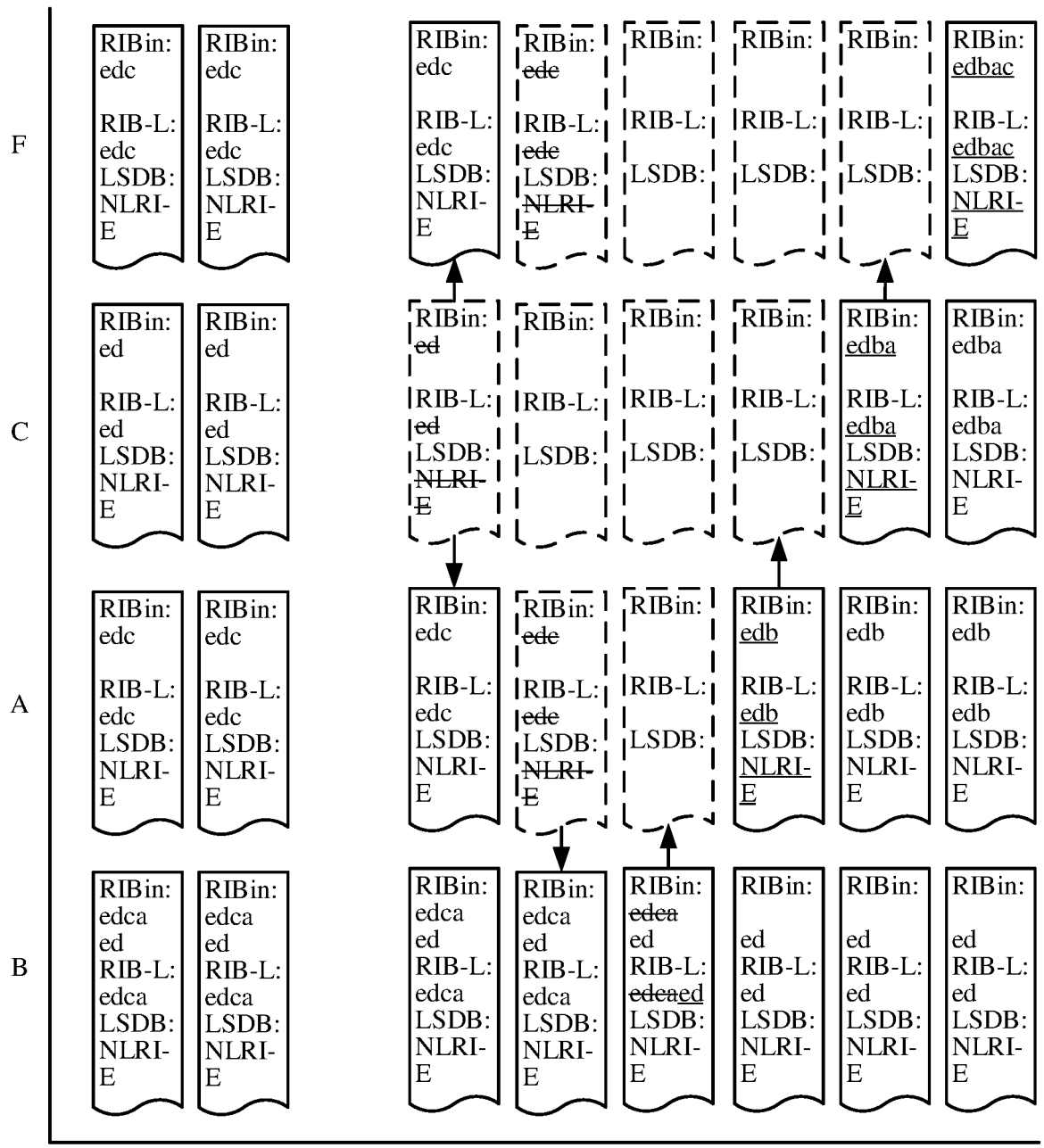
FIG. 3 shows an NLRI exchange process performed by a network device in FIG. 2 according to an existing protocol after a fault occurs.

For example, still refer to FIG. 2. If the NLRI-E stored in each network device converges at a moment t0, and at a specific moment (referred to as a moment t1) after t0, the network device C detects that the network device D and the network device C are unreachable with each other, the network devices shown in FIG. 2 need to perform the NLRI exchange process again. FIG. 3 shows the NLRI exchange process performed by the network devices in FIG. 2 according to an existing protocol. In FIG. 3, a horizontal axis coordinate represents a moment, and a vertical axis coordinate represents the network devices shown in FIG. 2. The horizontal axis coordinate and the vertical axis coordinate are used to jointly determine a text box. The text box represents a network device represented by the vertical axis coordinate. Content in the text box represents local information of the network device at a moment corresponding to the horizontal axis coordinate. The local information includes information about the NLRI-E in the RIBin, RIB-L, and LSDB. In FIG. 3, a line segment with an arrow represents an advertisement operation performed by a network device on route information. A strikethrough on a text in a text box represents an operation of deleting corresponding local information performed by the network device. An underscore at the bottom of the text in the text box represents an operation of adding corresponding local information performed by the network device.

After the network device C detects that the network device D and the network device C are unreachable with each other, NLRI-E-related information locally stored in the network device D remains unchanged. Therefore, FIG. 3 does not show a text box corresponding to the network device D.

With reference to FIG. 3, the following describes the NLRI exchange process performed again by each network device in FIG. 2.

It is assumed that the NLRI-E stored by each network device in FIG. 2 converges at the moment t0. For stored information related to the NLRI-E, refer to content in a text box corresponding to t0 in FIG. 3.

At the moment t1, the network device C detects that the network device D and the network device C are unreachable with each other, and the network device C starts a timer 1 (not shown in FIG. 3). It is assumed that duration of the timer 1 is set to T, and locally stored NLRI-E-related information is stored before the timer 1 expires, to be specific, ed is stored in the RIBin. Correspondingly, ed may be stored in the RIB-L, and NLRI-E may be stored in the LSDB.

At a moment t1+T, the timer 1 expires, and the network device C deletes ed from the local RIBin. Correspondingly, the network device C continues to delete ed from the local RIB-L, and deletes the NLRI-E from the local LSDB. After deleting ed from the local RIB-L, the network device C may separately send, to the network device A and the network device F, the withdrawal information edc' for withdrawing edc.

For ease of description, in this embodiment of this application, it is assumed that duration required for advertising route information between network devices is the same, and Δ is used to represent the duration. Compared with the duration required for advertising route information between network devices, duration required for an operation of deleting or adding locally stored information performed by the network device is usually short. Therefore, to facilitate description of an NLRI exchange process performed by the network device again, in FIG. 3, a plurality of operations with shorter intervals correspond to a same moment. However, in this embodiment of this application, the plurality of operations corresponding to a same moment in FIG. 3 are not limited to needing to be performed simultaneously.

At a moment t1+T+Δ, it is assumed that both the network device A and the network device F receive edc' from the network device C. Both the network device A and the network device F delete edc from the local RIBin, correspondingly continue to delete edc from the local RIB-L, and delete the NLRI-E from the local LSDB. In addition, after deleting edc from the local RIB-L, the network device A may send, to the network device B, withdrawal information edca' for withdrawing edca.

At a moment t1+T+2Δ, it is assumed that the network device B receives edca' from the network device A. The network device B deletes edca from the local RIBin, and correspondingly continues to delete edca from the local RIB-L. Because the local RIBin further stores ed, the network device B selects ed, stores ed in the local RIB-L, and stores, in the LSDB, the NLRI-E and the like in ed. After storing ed in the local RIB-L, the network device B may advertise ed to the network device A. Based on a reason similar to that described in S1.2, in this embodiment of this application, ed (or referred to as route information sent to the network device A based on ed) advertised by the network device B to the network device A is referred to as edb.

At a moment t1+T+3Δ, it is assumed that the network device A receives edb from the network device B. The network device A stores edb in the local RIBin, selects edb, stores edb in the local RIB-L, and then stores, in the LSDB, the NLRI-E and the like in edb. After storing edb in the local RIB-L, the network device A may advertise edb to the network device C. Based on a reason similar to that described in S1.2, in this embodiment of this application, edb advertised by the network device A to the network device C is referred to as edba.

At a moment t1+T+4Δ, it is assumed that the network device C receives edba from the network device A. The network device C stores edba in the local RIBin, selects edba, stores edba in the local RIB-L, and then stores, in the LSDB, the NLRI-E and the like in edba. After storing edba in the local RIB-L, the network device C may advertise edba to the network device F. Based on a reason similar to that described in S1.2, in this embodiment of this application, edba advertised by the network device C to the network device F is referred to as edbac.

At a moment t1+T+5Δ, it is assumed that the network device F receives edbac from the network device C. The network device F stores edbac in the local RIBin, selects edbac, stores edbac in the local RIB-L, and then stores, in the LSDB, the NLRI-E and the like in edbac.

The NLRI-E stored by the network device B, the network device A, the network device C, and the network device F converges at the moment t1+T+5Δ. It can be seen that convergence duration is T+5Δ. In addition, in a convergence process, although there are reachable links between the network device A, the network device C, and the network device F and the network device E, the network device A, the network device C, and the network device F respectively do not store the NLRI-E in local LSDBs in duration corresponding to 4Δ, 2Δ, and 4Δ (refer to dashed boxes corresponding to the device C in FIG. 3), and therefore cannot calculate a packet forwarding path to the network device E.

By analyzing the related content in FIG. 3, it is found that a main defect in the existing protocol is that, although the network device B locally stores route information (that is, ed) that reaches the network device B through a normal advertisement path (that is, a reachable link), the network device B can trigger the BGP NLRI selection process again only after receiving the withdrawal information (that is, edca') that is sent by the network device C and that is advertised by the network device A for withdrawing edca. As a result, the network device A, the network device C, and the network device F do not locally store the NLRI-E within long time after a fault occurs, and therefore cannot calculate the packet forwarding path to the network device E.

To resolve a technical problem caused by the defect in the existing protocol, for example, the BGP protocol may be extended in the following two aspects: 1. Route information includes a priority attribute. For example, an extended community (extended community) attribute is added in a path attribute field of the route information, and the priority attribute indicates a priority of the route information. 2. A selection rule related to the priority attribute (referred to as a priority selection rule) is added to selection rules in a BGP NLRI selection process. For example, the priority selection rule may include preferentially selecting route information with a higher priority indicated by the priority attribute.

In a possible implementation, similar to another attribute in the path attribute field in the route information described above, before continuing to advertise selected route information, a network device may modify a priority attribute in the selected route information, and then advertise modified route information to a BGP neighbor. The network device may increase or reduce a priority of corresponding route information by modifying a priority attribute, to control a BGP NLRI selection process of the BGP neighbor.

Optionally, in selection rules in the BGP NLRI selection process, the priority selection rule precedes an existing BGP identifier selection rule. For example, for two pieces of route information (which are respectively referred to as route information 1 and route information 2) that are received by the network device and in which NLRI is the same, in a process of performing BGP NLRI selection on the two pieces of route information, the network device may first select eligible route information according to the priority selection rule. Specifically, if a priority indicated by a priority attribute in the route information 1 is higher than a priority indicated by a priority attribute in the route information 2, the network device may select the route information as the eligible route information. If priorities indicated by the priority attribute in the route information 1 and the priority attribute in the route information 2 are the same, the network device may select eligible route information according to the existing BGP identifier selection rule.

In this embodiment of this application, the priority selection rule is not limited to being used as a first-priority selection rule in a BGP NLRI selection process. It is assumed that the selection rules in the BGP NLRI selection process further include a first rule, and the first rule precedes the priority selection rule. In this case, in the process of performing BGP NLRI selection on the route information 1 and the route information 2, the network device may first select eligible route information according to the first rule. If the eligible route information cannot be selected according to the first rule, the network device selects the eligible route information according to the priority selection rule.

Extension of the foregoing protocol helps enrich the selection rules of the BGP NLRI selection process, and further helps control the BGP NLRI selection process of the network device (for example, the network device B). This helps resolve the defect in the existing protocol.

Based on the foregoing extended BGP protocol, an embodiment of this application provides a route information selection method. The method is applicable to a network that supports the foregoing extended BGP protocol. The network may be, for example, the network shown in FIG. 1 or FIG. 2, or may be, for example, a network shown in FIG. 4.

Figure 4:
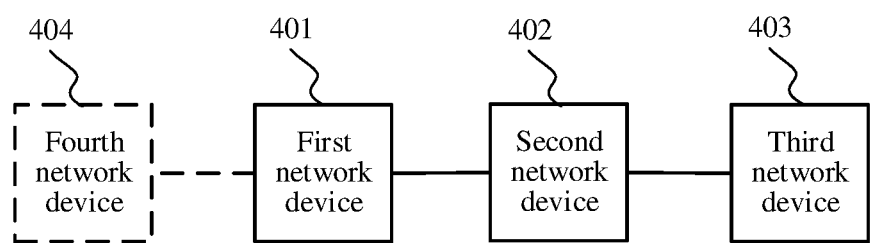
FIG. 4 shows another possible network to which an embodiment of this application is applicable.

FIG. 4 shows another possible network to which an embodiment of this application is applicable. Refer to FIG. 4. The network includes a first network device 401, a second network device 402, and a third network device 403. In FIG. 4, a connection line between the network devices is still used to represent a neighbor relationship between the network devices. To be specific, a neighbor relationship is established between the first network device 401 and the second network device 402. A neighbor relationship is established between the second network device 402 and the third network device 403. In a possible implementation, the network devices that establish a neighbor relationship with each other in FIG. 4 are directly connected to each other. In a possible implementation, the network shown in FIG. 4 may include more network devices. Optionally, the network devices shown in FIG. 4 and more network devices not shown in FIG. 4 may establish a neighbor relationship in a ring networking manner, for example, form the network shown in FIG. 1 or FIG. 2.

The first network device 401, the second network device 402, and the third network device 403 may be forwarding devices that support a BGP technology. The forwarding devices may be switches, routers, or other devices or network elements that support packet or data forwarding. In a possible implementation, the network device may be a physical entity in a network or an apparatus (for example, a chip or a functional module) in a physical entity. Alternatively, in a possible implementation, the network device may be a virtual device (for example, a virtual machine or container) running in a physical entity. For example, the virtual device may be a virtual router, a virtual switch, or the like.

Figure 5:
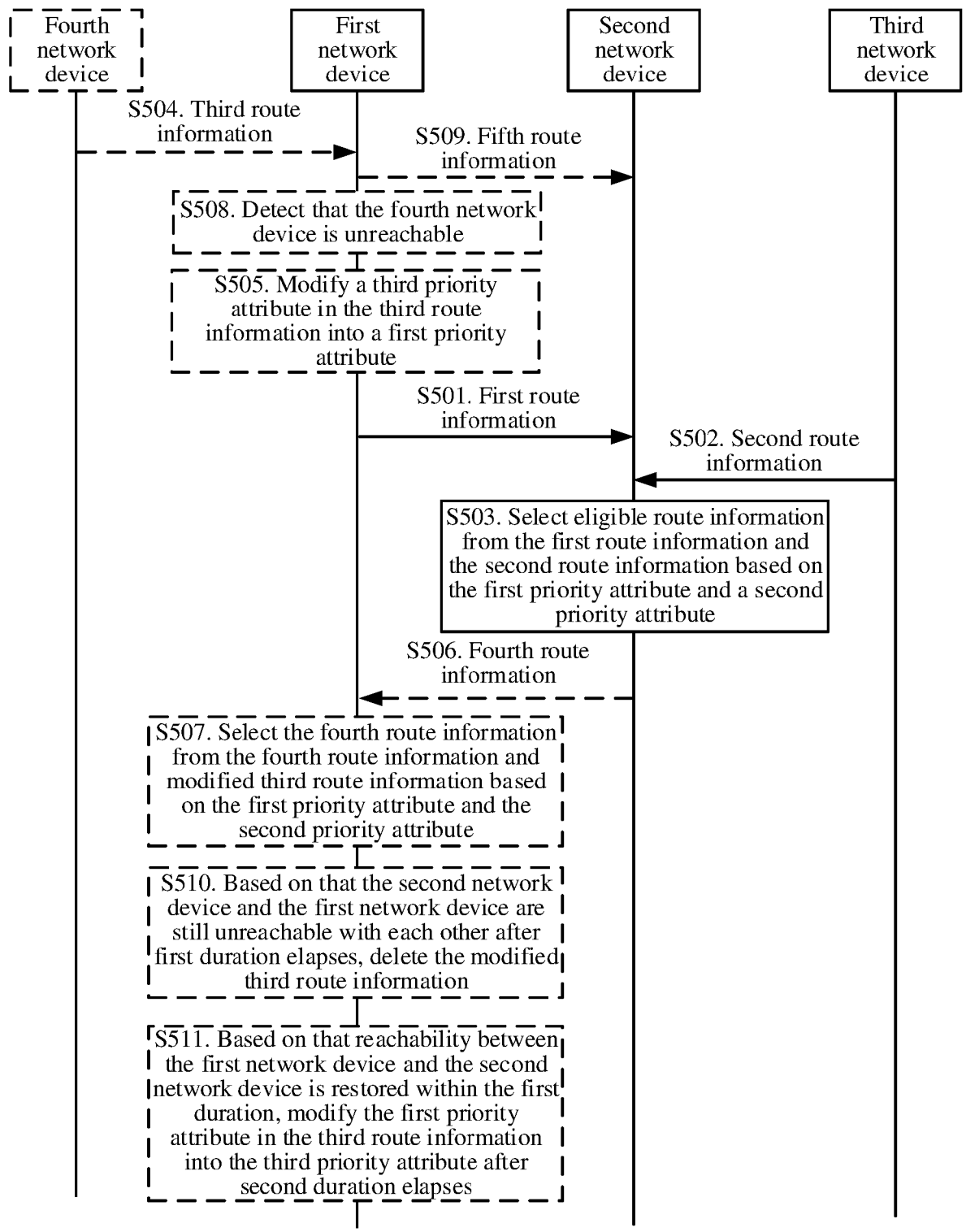
FIG. 5 shows a possible procedure of a route information processing method according to an embodiment of this application.

FIG. 5 shows a possible procedure of a route information selection method according to an embodiment of this application. Refer to FIG. 5. A possible embodiment of the route information selection method according to this application may include step S501 to step S503.

S501. A first network device sends first route information to a second network device.

For understanding of the first network device and the second network device, refer to the first network device 401 and the second network device 402 shown in FIG. 4 respectively. Correspondingly, both the first network device and the second network device are forwarding devices that support the foregoing extended BGP protocol, and a BGP neighbor relationship (a neighbor relationship for short) is established between the first network device and the second network device.

In a possible implementation, the first network device may send an update message to the second network device, and carry the first route information in the update message, to advertise selected route information to the second network device.

In a possible implementation, the first route information may include NLRI and a priority attribute.

In a possible implementation, the NLRI is node NLRI, or link NLRI, or topology prefix NLRI. The topology prefix NLRI may be IPv4 topology prefix NLRI or IPv6 topology prefix NLRI. Optionally, the NLRI may be an NLRI prefix in an NLRI field in route information.

Optionally, the priority attribute is an extended community attribute in the route information, and the priority attribute indicates a priority of the route information.

For example, a format of the priority attribute may be a changeable format including a type (T), a length (L), and a value (V). Correspondingly, the priority attribute includes a T field, an L field, and a V field, where the T field describes a label and/or an encoding format, the L field defines a length of the V field, and the V field represents an actual value of the priority attribute. For example, the length of the V field defined by the L field is one byte, and the V field may represent any integer between 0 to 255. In a possible implementation, a priority of the route information is a value represented by the V field in the priority attribute. In a possible implementation, a larger value corresponding to the priority of the route information indicates a higher priority of the route information.

For ease of description, the NLRI in the first route information is referred to as first NLRI, and the priority attribute in the first route information is referred to as a first priority attribute.

S502. The third network device sends second route information to the second network device.

For understanding of the third network device, refer to the third network device 403 shown in FIG. 4. Correspondingly, the third network device is a forwarding device that supports the foregoing extended BGP protocol, and a neighbor relationship is established between the third network device and the second network device.

In a possible implementation, the third network device may send an update message to the second network device, and carry the second route information in the update message, to advertise selected route information to the second network device.

The second route information may include NLRI and a priority attribute. In addition, the NLRI in the second route information is the same as the NLRI included in the first route information. Therefore, the NLRI in the second route information is referred to as the first NLRI in this embodiment of this application. In addition, the priority attribute included in the second route information may be different from the priority attribute included in the first route information. For ease of differentiation, the priority attribute in the second route information is referred to as a second priority attribute. The second priority attribute indicates a priority of the second route information.

In a possible implementation, that the second priority attribute is different from the first priority attribute may mean that the priority indicated by the second priority attribute is different from the priority indicated by the first priority attribute. More specifically, optionally, that the second priority attribute is different from the first priority attribute may be reflected in that a value represented by a V field of the second priority attribute is different from a value represented by a V field of the first priority attribute.

For understanding of the NLRI and the priority attribute, refer to related descriptions in step S501. Details are not described herein again.

S503. The second network device selects eligible route information from the first route information and the second route information based on the first priority attribute and the second priority attribute.

The second network device may receive the first route information and the second route information respectively from the first network device and the third network device. For understanding of the first route information and the second route information, refer to related content in step S501 and step S502 respectively. Details are not described herein again.

In a possible implementation, the second network device may select the eligible route information in a BGP NLRI selection process based on the priority selection rule described above, to be specific, select the eligible route information from the first route information and the second route information based on the first priority attribute and the second priority attribute.

Specifically, the second network device may determine the priority indicated by the first priority attribute in the first route information, and determine the priority indicated by the second priority attribute in the second route information. Then, the second network device may select, from the first route information and the second route information, route information with a higher priority as the eligible route information.

In a possible implementation, if a value represented by a V field of the priority attribute represents a priority, the second network device may select, from the first route information and the second route information, route information with a larger value represented by the V field of the priority attribute.

Optionally, in selection rules in the BGP NLRI selection process, the priority selection rule precedes an existing BGP identifier selection rule. In this embodiment of this application, route information that is in the first route information and the second route information and that is not selected by the second network device is referred to as ineligible route information. In a possible implementation, a BGP identifier of a network device corresponding to the eligible route information may be less than a BGP identifier of a network device corresponding to the ineligible route information. In this embodiment of this application, the priority selection rule is not limited to being used as a first-priority selection rule in the BGP NLRI selection process. For a relationship between the priority selection rule and another selection rule (for example, a BGP identifier selection rule), refer to the foregoing related description. Details are not described herein again.

It can be seen from step S501 to step S503 that the first network device and the third network device may control the BGP NLRI selection process of the second network device by using the priority attribute in the route information sent to the second network device. This helps resolve a defect in an existing protocol.

In the embodiment corresponding to FIG. 5, in this application, step S502 is not limited to needing to be performed after step S501. In a possible implementation, step S502 may be performed before step 501, or may be performed simultaneously with step S501.

In a possible implementation, the first network device may be an origin (origin) device of the first NLRI, and a network device corresponding to the first NLRI may be the first network device. The first network device generates route information that includes the first NLRI and advertises the route information to the network device in the network shown in FIG. 4. The second network device or the third network device may calculate a packet forwarding path to the first network device based on the first NLRI. Optionally, a neighbor relationship may be established between the first network device and the third network device, or the first network device may advertise, to the third network device via another network device, the route information that includes the first NLRI. In a possible implementation, the first network device fills in the generated route information (for example, the first route information) with the priority attribute based on a default field. If a value that may be represented by the V field in the priority attribute is any integer between 0 and 255 (including 0 and 255), for example, the value represented by the default field may be 1.

In a possible implementation, the first network device is not the origin device of the first NLRI. Correspondingly, in a possible implementation, the network shown in FIG. 4 may further include a fourth network device 404. A neighbor relationship is established between the first network device 401 and the fourth network device 404. In a possible implementation, the first network device 401 and the fourth network device 404 are directly connected to each other. In a possible implementation, the first NLRI in the embodiment corresponding to FIG. 4 may be the NLRI-E in the embodiment corresponding to FIG. 2. The fourth network device 404, the first network device 401, the second network device 402, and the third network device 403 may be respectively the network device E, the network device D, the network device C, and the network device A in the network shown in FIG. 2, or may be respectively the network device D, the network device C, the network device A, and the network device B in the network shown in FIG. 2, or may be respectively the network device C, the network device A, the network device B, and the network device D in the network shown in FIG. 2. In a possible implementation, before step S501, the method in the embodiment corresponding to FIG. 5 may further include step S504.

S504. The first network device receives third route information from the fourth network device.

For understanding of the fourth network device, refer to the fourth network device 404 shown in FIG. 4. Details are not described herein again.

In a possible implementation, the fourth network device may send an update message to the first network device, and carry the third route information in the update message, to advertise selected route information to the first network device.

The third route information may include the first NLRI and a third priority attribute. In a possible implementation, the first network device selects the third route information in the BGP NLRI selection process, and then sends the first route information to the second network device based on the third route information.

In a possible implementation, before step S501, the embodiment corresponding to FIG. 5 may further include step S505.

S505. The first network device modifies the third priority attribute in the third route information into the first priority attribute.

After receiving the third route information, the first network device may modify the third priority attribute in the third route information into the first priority attribute, and then send the first route information to the second network device based on modified third route information.

In a possible implementation, a priority indicated by a priority attribute (that is, the first priority attribute) obtained through modifying the third priority attribute may be higher than a priority indicated by the third priority attribute. For example, if a value represented by a V field of the third priority attribute is 1, a value represented by the V field of the first priority attribute may be 2. If a value represented by the second priority attribute in the second route information is 1, the eligible route information selected in step S503 is the first route information.

Alternatively, in a possible implementation, a priority indicated by a priority attribute (that is, the first priority attribute) obtained through modifying the third priority attribute may be lower than a priority indicated by the third priority attribute. For example, if a value represented by a V field of the third priority attribute is 1, a value represented by the V field of the first priority attribute may be 0. Correspondingly, the eligible route information selected in step S503 is the second route information.

For example, both the second priority attribute and the third priority attribute are higher than the first priority attribute. Correspondingly, the eligible route information selected in step S503 is the second route information. In a possible implementation, after step S503, the method embodiment corresponding to FIG. 4 may further include step S506 and step S507.

S506. The second network device sends fourth route information to the first network device based on the second route information.

After selecting the second route information as the eligible route information, the second network device may store, in a local LSDB, the first NLRI and the like in the second route information, and advertise the selected second route information to the first network device, to be specific, send the fourth route information to the first network device based on the second route information. The fourth route information includes the first NLRI and the second priority attribute.

In a possible implementation, the second network device may send an update message to the first network device, and carry the fourth route information in the update message, to advertise the selected route information to the first network device.

S507. The first network device selects the fourth route information from the fourth route information and the modified third route information based on the first priority attribute and the second priority attribute.

Because the second priority attribute is higher than the first priority attribute, when performing the BGP NLRI selection process on the modified third route information and the received fourth route information according to the priority selection rule, the first network device selects the fourth route information as the eligible route information.

After selecting the fourth route information, the first network device may store, in a local LSDB, the first NLRI and the like in the fourth route information. Optionally, the first network device may advertise the selected fourth route information to the fourth network device.

It can be found from the steps described above that, after receiving the third route information from the fourth network device, the first network device may reduce, by modifying the priority attribute in the third route information, a priority of route information advertised to the first network device via the fourth network device. This helps obtain, from the second network device, route information (that is, the fourth route information) that reaches the first network device through another advertisement path, and choose to store the route information (that is, the fourth route information) that reaches the first network device through the another advertisement path.

It is assumed that after step S504 and before step S501, the fourth network device and the first network device are unreachable with each other. In a possible implementation, the embodiment corresponding to FIG. 5 may further include step S508.

S508. The first network device detects that the fourth network device and the first network device are unreachable with each other.

That the fourth network device and the first network device are unreachable with each other means that a link that can forward a packet does not exist between the first network device and the fourth network device. A reason why the fourth network device and the first network device are unreachable with each other is not limited in this embodiment of this application. As an example, the reason why the fourth network device and the first network device are unreachable with each other includes at least one of the following faults: a fault occurs on the first network device and/or the fourth network device, a fault occurs on a link (referred to as a first link) between the first network device and the fourth network device, and a fault occurs on a port corresponding to the first link in the first network device.

In a possible implementation, the first network device performs step S505 in response to detecting that the fourth network device and the first network device are unreachable with each other, and the priority indicated by the first priority attribute is lower than the priority indicated by the third priority attribute.

It can be seen that, based on the foregoing extension of the BGP protocol, it is beneficial that after a network device detects that a specific advertisement path is unreachable to the network device, the network device adjusts an advertisement path of route information selected by each network device in the network. This helps the network device store route information that passes through a normal advertisement path, to ensure that a packet is forwarded to a target network.

In a possible implementation, after first duration that is after the first network device detects that the fourth network device and the first network device are unreachable with each other, if the fourth network device and the first network device are still unreachable with each other, the first network device may delete the locally stored modified third route information.

In a possible implementation, within the first duration that is after the first network device detects that the fourth network device and the first network device are unreachable with each other, if reachability between the first network device and the fourth network device is restored, the first network device may restore the priority attribute in the third route information to the third priority attribute. It is assumed that the priority indicated by the third priority attribute is the same as the priority indicated by the second priority attribute, and a BGP identifier of the fourth network device is greater than a BGP identifier of the second network device, the first network device may select the third route information from the third route information and the fourth route information that are stored in a RIBin. Then, the first network device may advertise the third route information to the second network device, and store, in the local LSDB, the NLRI and the like in the third route information.

In a possible implementation, to reduce network jitter, the first network device may restore the priority attribute in the third route information to the third priority attribute after the second duration that is after the first network device detects that reachability between the first network device and the fourth network device is restored elapses.

In a possible implementation, after step S504 and before step S508, the method in the embodiment corresponding to FIG. 5 may further include step S509.

S509. The first network device sends fifth route information to the second network device based on the third route information.

In a possible implementation, after receiving the third route information, the first network device may select the third route information. Then, the first network device may store, in the local LSDB, the first NLRI and the like in the third route information, and may advertise the selected third route information to the second network device, to be specific, send the fifth route information to the second network device based on the third route information. The fifth route information includes the first NLRI, and a priority attribute in the fifth route information is the third priority attribute.

In a possible implementation, after receiving the fifth route information, the second network device may select the fifth route information, store, in the local LSDB, the first NLRI and the like in the fifth route information, and advertise the selected fifth route information to the third network device.

In a possible implementation, the first network device may send an update message to the second network device, and carry the fifth route information in the update message, to advertise the selected route information to the second network device.

In a possible implementation, after step S507, the method in the embodiment corresponding to FIG. 5 may further include step S510.

S510. Based on that the second network device and the first network device are still unreachable with each other after the first duration elapses, the first network device deletes the modified third route information.

If the fourth network device and the first network device are still unreachable with each other after the first duration that is after the first network device detects that the fourth network device and the first network device are unreachable with each other elapses, the first network device may delete the modified third route information.

S511. Based on that reachability between the first network device and the second network device is restored within the first duration, the first network device modifies the first priority attribute in the third route information into the third priority attribute after the second duration elapses.

If the reachability between the first network device and the fourth network device is restored within the first duration that is after the first network device detects that the fourth network device and the first network device are unreachable with each other, the first network device may restore the priority attribute in the third route information to the third priority attribute. To reduce network jitter, after the second duration that is after the reachability between the first network device and the fourth network device is restored or after the first duration elapses, the first network device may modify the first priority attribute in the third route information into the third priority attribute.

Then, the first network device may perform the BGP NLRI selection process on locally stored route information that includes the first NLRI (for example, the third route information and the fourth route information). Then, the first network device may store, in the local LSDB, the first NLRI and the like in the selected third route information, advertise the selected third route information to the second network device, and trigger the second network device to perform the BGP NLRI selection process again.

As an example, FIG. 5 shows a possible procedure according to an embodiment of this application, and focuses on a process in which the first network device and the second network device select route information with a higher priority. The embodiment corresponding to FIG. 5 may further include more steps. For example, optionally, after step S501, the second network device may update the locally stored fifth route information to the first route information. Then, optionally, the second network device may select the first route information. Then, optionally, the second network device may send sixth route information to the third network device based on the first route information. The sixth route information includes the first NLRI and the first priority attribute. Optionally, because the priority indicated by the first priority attribute is lower than the priority indicated by the second priority attribute, the second route information may be sent by the third network device after the third network device performs the BGP NLRI selection process based on the sixth route information.

With reference to the network shown in FIG. 1, the following describes a possible specific procedure of the method in the embodiment corresponding to FIG. 5. It is assumed that the first NLRI in the embodiment corresponding to FIG. 5 corresponds to the NLRI-E in the network device E shown in FIG. 1. It is assumed that the fourth network device, the first network device, the second network device, and the third network device are respectively the network device D, the network device C, the network device A, and the network device B in the network shown in FIG. 1. It is assumed that each network device shown in FIG. 1 supports the extended BGP protocol described in this embodiment of this application.

In a possible implementation, each network device shown in FIG. 1 may advertise, based on the process of the embodiment corresponding to FIG. 2, the NLRI-E until the NLRI-E converges for the first time. However, different from the embodiment corresponding to FIG. 2, the route information advertised by each network device includes a priority attribute, and before the first convergence, each network device does not modify the priority attribute in a process of advertising the route information. It is assumed that, before the first convergence, the priority indicated by the priority attribute in the route information is 1, and a larger value corresponding to the priority indicates a higher priority.

Figure 6:
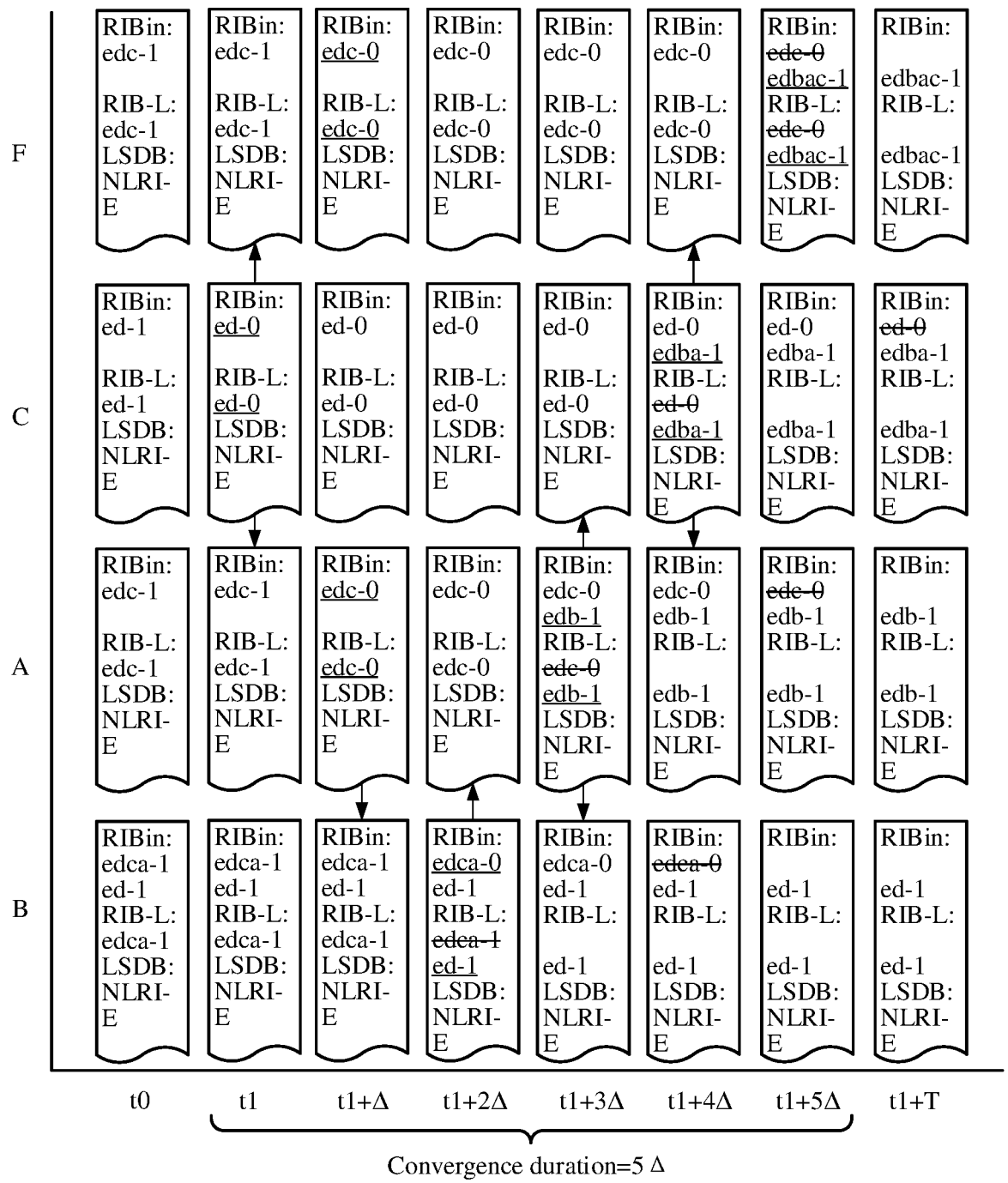
FIG. 6 shows an NLRI exchange process performed by a network device in FIG. 1 according to an extended BGP protocol according to an embodiment of this application.

If the NLRI-E stored in each network device in FIG. 1 converges at a moment t0, and at a specific moment (referred to as a moment t1) after t0, the network device C detects that the network device D and the network device C are unreachable with each other, the network device shown in FIG. 1 needs to perform an NLRI exchange process again until the NLRI-E converges after a fault occurs in each network device. FIG. 6 shows an NLRI exchange process performed by the network device in FIG. 1 according to an extended BGP protocol according to an embodiment of this application. Different from FIG. 3, in FIG. 6, "-0" or "-1" is added after letters representing route information, to represent that a priority indicated by a priority attribute in the route information is 0 or 1. In FIG. 6, an underscore at the bottom of text in a text box represents an operation of adding or updating corresponding local information performed by the network device. For understanding of other same content (for example, horizontal axis coordinates, vertical axis coordinates, strikethroughs, line segments with arrows, and text boxes) in FIG. 6 that is the same as that in FIG. 3, refer to related descriptions corresponding to FIG. 3. Details are not described herein again.

It is assumed that the NLRI-E stored by each network device in FIG. 1 converges at the moment t0. For stored information related to the NLRI-E, refer to content in a text box corresponding to t0 in FIG. 6.

At a moment t1, the network device C detects that the network device D and the network device C are unreachable with each other, and the network device C modifies a priority attribute in ed-1 in the RIBin, so that a value represented by the priority attribute is 0. In this embodiment of this application, modified ed-1 is referred to as ed-0. Then, the network device C stores the selected ed-0 in the RIB-L, and advertises edc-0 to the network device A and the network device F respectively based on ed-0.

Similar to the embodiment corresponding to FIG. 3, for ease of description, in the embodiment corresponding to FIG. 6, it is assumed that duration needed for advertising route information between network devices is the same, and Δ is used to represent the duration. Compared with the duration needed for advertising the route information between the network devices, duration needed for an operation of deleting or adding locally stored information performed by the network device is usually short. Therefore, to facilitate description of an NLRI exchange process performed by the network device again, in FIG. 6, a plurality of operations with short intervals correspond to a same moment. However, in this embodiment of this application, the plurality of operations corresponding to a same moment in FIG. 6 are not limited to needing to be performed simultaneously.

At a moment t1+Δ, the network device A and the network device F separately receive edc-0 from the network device C, separately update edc-1 stored in a local RIBin to edc-0, and then separately store the selected edc-0 in a local RIB-L. Then, the network device A may advertise edca-0 to the network device B based on edc-0.

At a moment t1+2Δ, the network device B receives edca-0 from the network device A. The network device B updates edca-1 in the local RIBin to edca-0. Because a priority indicated by the priority attribute in edca-0 is lower than a priority indicated by the priority attribute in ed-1 in the local RIBin, the network device may select ed-1. Then, the network device B stores ed-1 in the local RIB-L, and stores, in the LSDB, NLRI-E in ed-1 and the like. After storing ed-1 in the local RIB-L, the network device B may advertise edb-1 to the network device A.

At a moment t1+3Δ, the network device A receives edb-1 from the network device B, and stores edb-1 in a local RIBin. The network device A selects edc-0 from edb-1 and edc-0 in the local RIBin, and stores, in the local RIB-L, NLRI-E and the like in edb-1. After replacing edb-1 with edc-0 and storing edc-0 in the local RIB-L, the network device A may advertise edb-1 (the sent route information is referred to as edba-1) to the network device C, and in addition, advertise withdrawal information edca-0' for withdrawing edca-0 to the network device B.

At a moment t1+4Δ, the network device C and the network device B respectively receive edba-1 and the edca-0' from the network device A. The network device B may delete edca-0 from the local RIBin based on edca-0'. The network device C stores edba-1 in the local RIBin, selects edba-1 from edba-1 and ed-0, stores edba-1 in the local RIB-L, and then stores, in the LSDB, the NLRI-E and the like in edba-1. After storing edba-1 in the local RIB-L, the network device C may advertise edbac-1 to the network device F, and in addition, respectively advertise the withdrawal information edc-0' for withdrawing edc-0 to the network device F and the network device A based on ed-0.

At a moment t1+5Δ, the network device F and the network device A separately receive edca-0' from the network device C. The network device F deletes edc-0 from the local RIBin based on edc-0', stores edbac-1 in the local RIBin, selects edbac-1, stores edbac-1 in the local RIB-L, and then stores, in the LSDB, the NLRI-E and the like in edbac-1. The network device A deletes edc-0 from the local RIBin based on edc-0'.

The NLRI-E stored by the network device B, the network device A, the network device C, and the network device F converges at the moment t1+5Δ. It can be seen that the convergence duration is 5Δ, less than T+5Δ in the embodiment corresponding to FIG. 3, thereby helping shorten duration of re-convergence after a fault occurs. In addition, in a convergence process, the network device A, the network device C, and the network device F always store the NLRI-E in the local LSDB, and may calculate a packet forwarding path to a network device E.

Similar to the embodiment corresponding to FIG. 3, in a possible implementation, after detecting that the network device D and the network device C are unreachable with each other, the network device C may start a timer 1 (not shown in FIG. 6), and duration of the timer 1 is set to T. If the network device D and the network device C are still unreachable with each other before the timer 1 expires, the network device C may delete ed-0 from the RIBin after the timer 1 expires (for example, at a moment t1+T).

To resolve a technical problem caused by a defect in an existing protocol, for example, an embodiment of this application further provides another route information processing method. The method is applicable to a network that supports the foregoing extended BGP protocol. The network may be, for example, the network shown in FIG. 1 or FIG. 2, or may be, for example, a network shown in FIG. 7.

Figure 7:
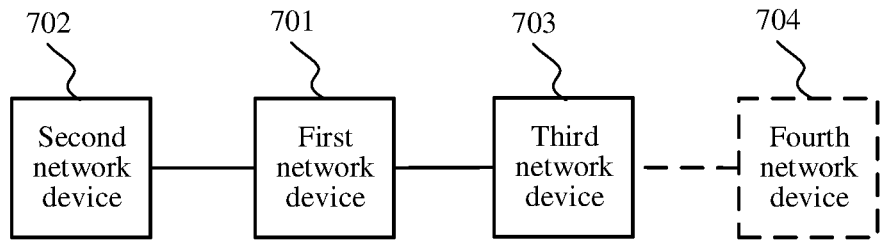
FIG. 7 shows another possible network to which an embodiment of this application is applicable.

FIG. 7 shows another possible network to which an embodiment of this application is applicable. Refer to FIG. 7. The network includes a first network device 701, a second network device 702, and a third network device 703. In FIG. 7, a connection line between the network devices is still used to represent a neighbor relationship between the network devices. To be specific, a neighbor relationship is established between the first network device 701 and the second network device 702, and a neighbor relationship is established between the first network device 701 and the third network device 703. In a possible implementation, the network devices that establish a neighbor relationship with each other in FIG. 7 are directly connected to each other. In a possible implementation, the network shown in FIG. 7 may include more network devices. Optionally, the network devices shown in FIG. 7 and more network devices not shown in FIG. 7 may establish a neighbor relationship in a ring networking manner, for example, form the network shown in FIG. 1 or FIG. 2.

In a possible implementation, for understandings of the first network device 701, the second network device 702, and the third network device 703, refer to related descriptions of the first network device 401, the fourth network device 404, and the second network device 402 in FIG. 4. Details are not described herein again.

Figure 8:
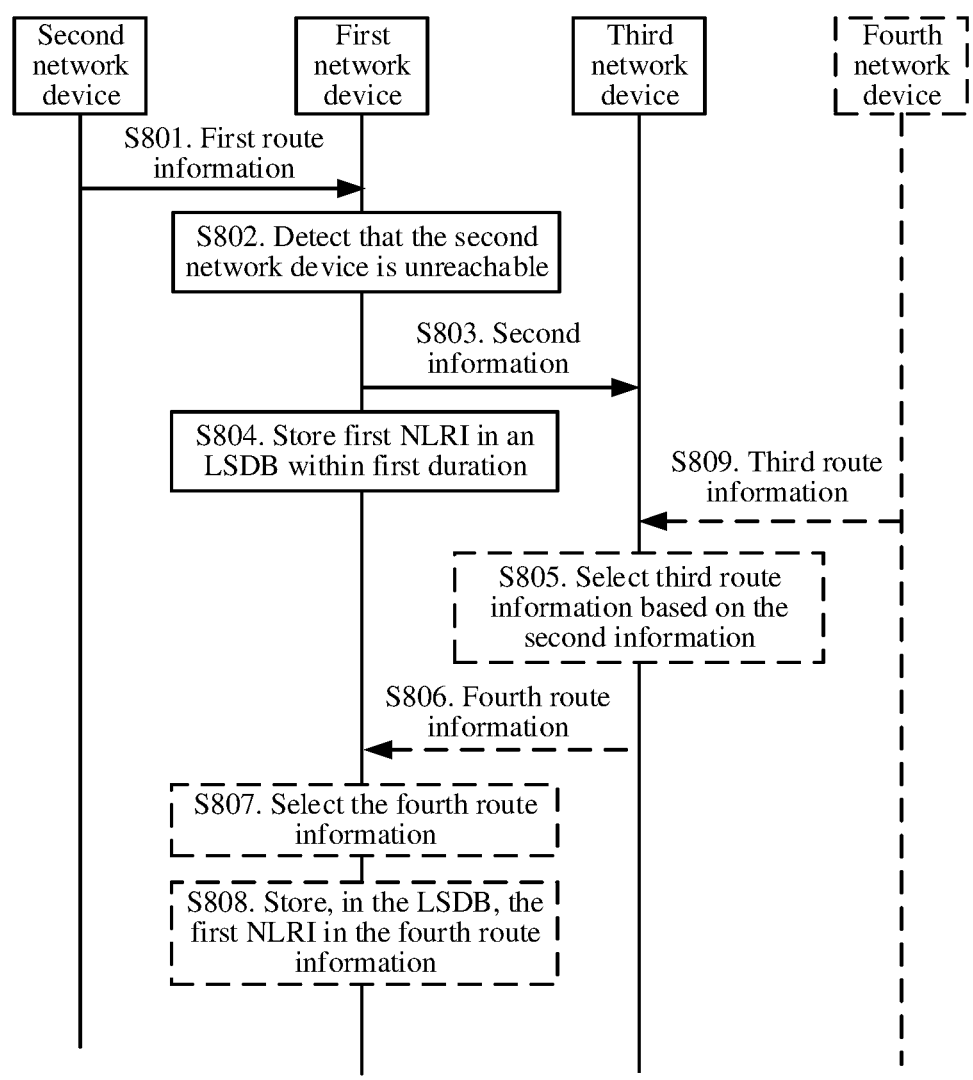
FIG. 8 to FIG. 10 each show another possible procedure of a route information processing method according to an embodiment of this application.

FIG. 8 shows another possible procedure of a method according to an embodiment of this application. Refer to FIG. 8. A method in another possible embodiment of this application may include step S801 to step S804. In a possible implementation, for understanding of a first network device to a third network device in the embodiment shown in FIG. 8, respectively refer to the first network device 701 to the third network device 703 in the network shown in FIG. 7. In a possible implementation, first NLRI in the embodiment corresponding to FIG. 8 corresponds to the NLRI-E of the network device E in the embodiment corresponding to FIG. 2, and the second network device, the first network device, and the third network device are respectively the network device D, the network device C, and the network device A in the network shown in FIG. 1 or FIG. 2.

S801. The second network device sends first route information to the first network device.

A BGP neighbor relationship is established between the first network device and the second network device. It is assumed that route information may be transmitted between the first network device and the second network device through a first link. Optionally, the first link is a direct link. In this embodiment of this application, the route information sent by the second network device to the first network device is referred to as first route information.

The first route information may include NLRI corresponding to a target network. For ease of description, in this embodiment of this application, the NLRI in the first route information is referred to as first NLRI.

In a possible implementation, the second network device may send an update message to the first network device, and carry the first route information in the update message, to advertise selected route information to the first network device.

S802. The first network device detects that the second network device and the first network device are unreachable with each other.

A reason why the second network device and the first network device are unreachable with each other is not limited in this embodiment of this application. As an example, the reason why the second network device and the first network device are unreachable with each other includes at least one of the following faults: a fault occurs on the first network device and/or the second network device, a fault occurs on a first link between the first network device and the second network device, and a fault occurs on a port corresponding to the first link in the first network device.

S803. The first network device sends second information to the third network device based on the first route information.

After detecting that the second network device and the first network device are unreachable with each other, the first network device may send the second information to the third network device based on the first route information.

In a possible implementation, the second information includes the first NLRI, and the second information indicates the third network device to select third route information. The third route information includes the first NLRI, and an advertisement path of the third route information to the third network device does not pass through the first link.

In a possible implementation, the first network device may send an update message to the third network device, and include the second information in the update message, where the second information may be route information, and is for advertising selected route information to the third network device, or the second information may be withdrawal information, and is for withdrawing previously sent route information that includes the first NLRI.

S804. The first network device stores the first NLRI in an LSDB within first duration that is after the first network device sends the second information.

The first network device may store the first NLRI in the LSDB within the first duration that is after the first network device sends the second information, to calculate a packet forwarding path (or referred to as a route) from the first network device to the target network.

After the first network device detects that the second network device and the first network device are unreachable with each other, the first network device may send the second information to the third network device, to indicate the third network device to select the third route information whose advertisement path does not pass through the first link. This helps the third network device calculate a packet forwarding path to the target network based on the first NLRI in the third route information. In addition, the first network device may store the first NLRI in the LSDB within the first duration, to calculate the packet forwarding path to the target network based on the first NLRI.

In a possible implementation, after step S802, the method in the embodiment corresponding to FIG. 8 may further include step S805 and step S806.

S805. The third network device selects the third route information based on the second information.

Based on that the third network device locally stores the third route information that includes the first NLRI and whose advertisement path does not pass through the first link, the third network device may select the third route information after receiving the second information. Then, the first NLRI and the like in the third route information may be stored in a local LSDB.

S806. The third network device sends fourth route information to the first network device based on the third route information.

After selecting the third route information, the third network device may advertise the third route information to the first network device, to be specific, send the fourth route information to the first network device based on the third route information. The fourth route information includes the first NLRI, and an advertisement path of the fourth route information does not pass through the first link either.

The third network device sends the fourth route information to the first network device based on the third route information. This helps the first network device store the route information that includes the first NLRI and whose advertisement path does not pass through the first link, and helps the first network device calculate a packet forwarding path to the target network.

In a possible implementation, the third network device may send an update message to the first network device, and carry the fourth route information in the update message, to advertise selected route information to the first network device.

In a possible implementation, after step S806, the method in the embodiment corresponding to FIG. 8 may further include step S807.

S807. The first network device selects the fourth route information.

S808. The first network device stores, in the LSDB, the first NLRI in the fourth route information.

After receiving the fourth route information from the third network device, the first network device may select the fourth route information. Then, the first network device may store, in the local LSDB, the first NLRI in the fourth route information.

In this case, the first network device selects the fourth route information whose advertisement path does not pass through the first link. This helps the first network device calculate, based on the first NLRI in the fourth route information, the packet forwarding path to the target network.

In a possible implementation, the network shown in FIG. 7 may further include a fourth network device 704. A neighbor relationship is established between the third network device 703 and the fourth network device 704. In a possible implementation, the third network device 703 and the fourth network device 704 are directly connected to each other. For understanding of the fourth network device 704, refer to related descriptions of the third network device 403 in FIG. 4. Details are not described herein again. For understanding of the fourth network device in the embodiment corresponding to FIG. 8, refer to the fourth network device 704 shown in FIG. 7.

In a possible implementation, before step S805, the method in the embodiment corresponding to FIG. 8 may further include step S809.

S809. The fourth network device sends the third route information to the third network device.

In a possible implementation, the fourth network device may send an update message to the third network device, and carry the third route information in the update message, to advertise selected route information to the third network device.

A time sequence of step S809 and step S803 is not limited in this embodiment of this application, provided that step S809 is performed before step S805.

Figure 9:
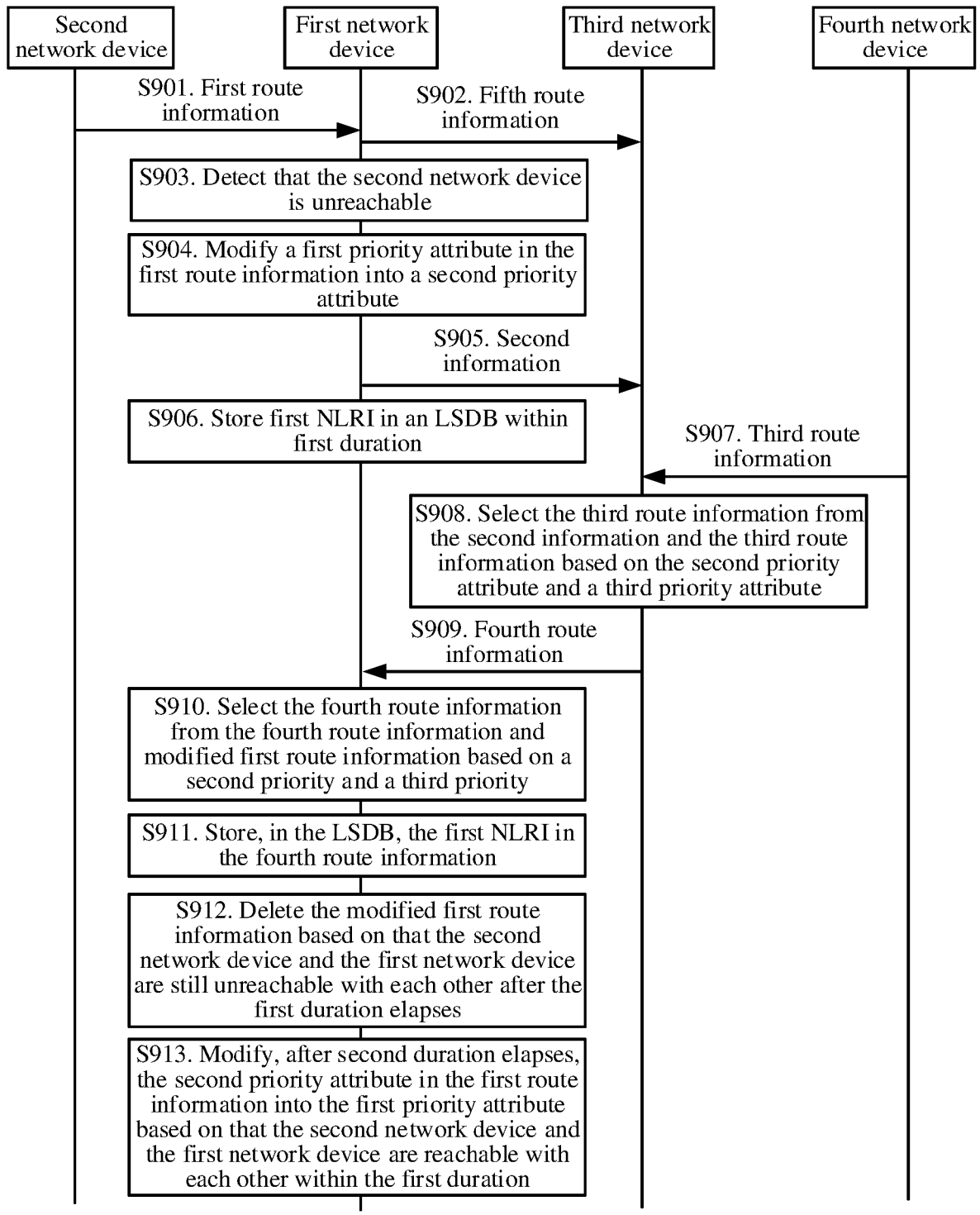

In a possible implementation, the network device in the embodiment corresponding to FIG. 8 may support the extended BGP protocol described above. Route information involved in the embodiment corresponding to FIG. 8 may include the priority attribute in the embodiment corresponding to FIG. 5. For understanding of the second information involved in the embodiment corresponding to FIG. 8, refer to the second route information in the embodiment corresponding to FIG. 5. The following describes, through a procedure shown in FIG. 9, detailed steps in the embodiment corresponding to FIG. 8 in this case. Refer to FIG. 9. A route information processing method in this application may include step S90 to step S913.

In a possible implementation, for understanding of a first network device to a third network device in the embodiment shown in FIG. 9, respectively refer to the first network device 701 to the third network device 703 in the network shown in FIG. 7. In a possible implementation, first NLRI in the embodiment corresponding to FIG. 9 corresponds to the NLRI-E of the network device E in the embodiment corresponding to FIG. 2, and the second network device, the first network device, and the third network device are respectively the network device D, the network device C, and the network device A in the network shown in FIG. 1 or FIG. 2.

S901. The second network device sends first route information to the first network device.

S902. The first network device sends fifth route information to the third network device.

S903. The first network device detects that the second network device and the first network device are unreachable with each other.

S904. The first network device modifies a first priority attribute in the first route information into a second priority attribute.

S905. The first network device sends second information to the third network device.

S906. The first network device stores the first NLRI in an LSDB within first duration.

The first network device may not delete modified first route information within the first duration that is after the first network device detects that the second network device and the first network device are unreachable with each other. In addition, before receiving the fourth route information, the first network device may store, in the local LSDB, the first NLRI and the like in the modified first route information. After receiving and selecting the fourth route information, the first network device may store, in the local LSDB, the first NLRI and the like in the fourth route information.

It can be seen that if the first network device does not receive the fourth route information within the first duration, the first NLRI stored by the first network device in the LSDB is from the modified first route information. If the first network device receives the fourth route information within the first duration, the first NLRI stored by the first network device in the LSDB is first from the modified first route information, and then is changed to be from the fourth route information.

After the first duration that is after the first network device detects that the second network device and the first network device are unreachable with each other elapses, if the second network device and the first network device are still unreachable with each other, the first network device may delete the modified first route information.

After the first duration that is after the first network device detects that the second network device and the first network device are unreachable with each other, if reachability between the first network device and the second network device is restored, the first network device may restore the priority attribute in the first route information to the first priority attribute, and then may perform a BGP NLRI selection process again on the stored route information (for example, first route information and fourth route information that are modified again) that includes the first NLRI.

To reduce network jitter, within the second duration that is after the reachability between the first network device and the second network device is restored, the first network device temporarily does not perform a step of restoring the priority attribute in the first route information to the first priority attribute, but restores the priority attribute in the first route information to the first priority attribute after the second duration elapses.

S907. A fourth network device sends third route information to the third network device.

S908. The third network device selects the third route information from the second information and the third route information based on the second priority attribute and a third priority attribute.

S909. The third network device sends fourth route information to the first network device.

S910. The first network device selects the fourth route information from the fourth route information and the modified first route information based on a second priority and a third priority.

S911. The first network device stores, in the LSDB, the first NLRI in the fourth route information.

S912. The first network device deletes the modified first route information after the first duration elapses based on that the second network device and the first network device are still unreachable with each other after the first duration elapses.

S913. The first network device modifies, after the second duration elapses, the second priority attribute in the first route information into the first priority attribute based on that the second network device and the first network device are reachable with each other after the first duration elapses.

In the embodiment corresponding to FIG. 9 and the embodiment corresponding to FIG. 8, the same words have the same meaning. In addition, because the embodiment corresponding to FIG. 9 is based on the extended BGP protocol described above, in the embodiment corresponding to FIG. 9, for understanding of steps performed by the second network device, the first network device, the third network device, and the fourth network device, refer to corresponding steps performed by the fourth network device, the first network device, the second network device, and the third network device in the embodiment shown in FIG. 5. For understanding of the first route information, the fifth route information, the second information, the third route information, and the fourth route information in the embodiment corresponding to FIG. 9, refer to the third route information, the fifth route information, the first route information, the second route information, and the fourth route information in the embodiment shown in FIG. 5. For understanding of the first priority attribute, the second priority attribute, and the third priority attribute in the embodiment corresponding to FIG. 9, further respectively refer to the third priority attribute, the first priority attribute, and the second priority attribute in the embodiment corresponding to FIG. 5. Details are not described herein again.

Figure 10:
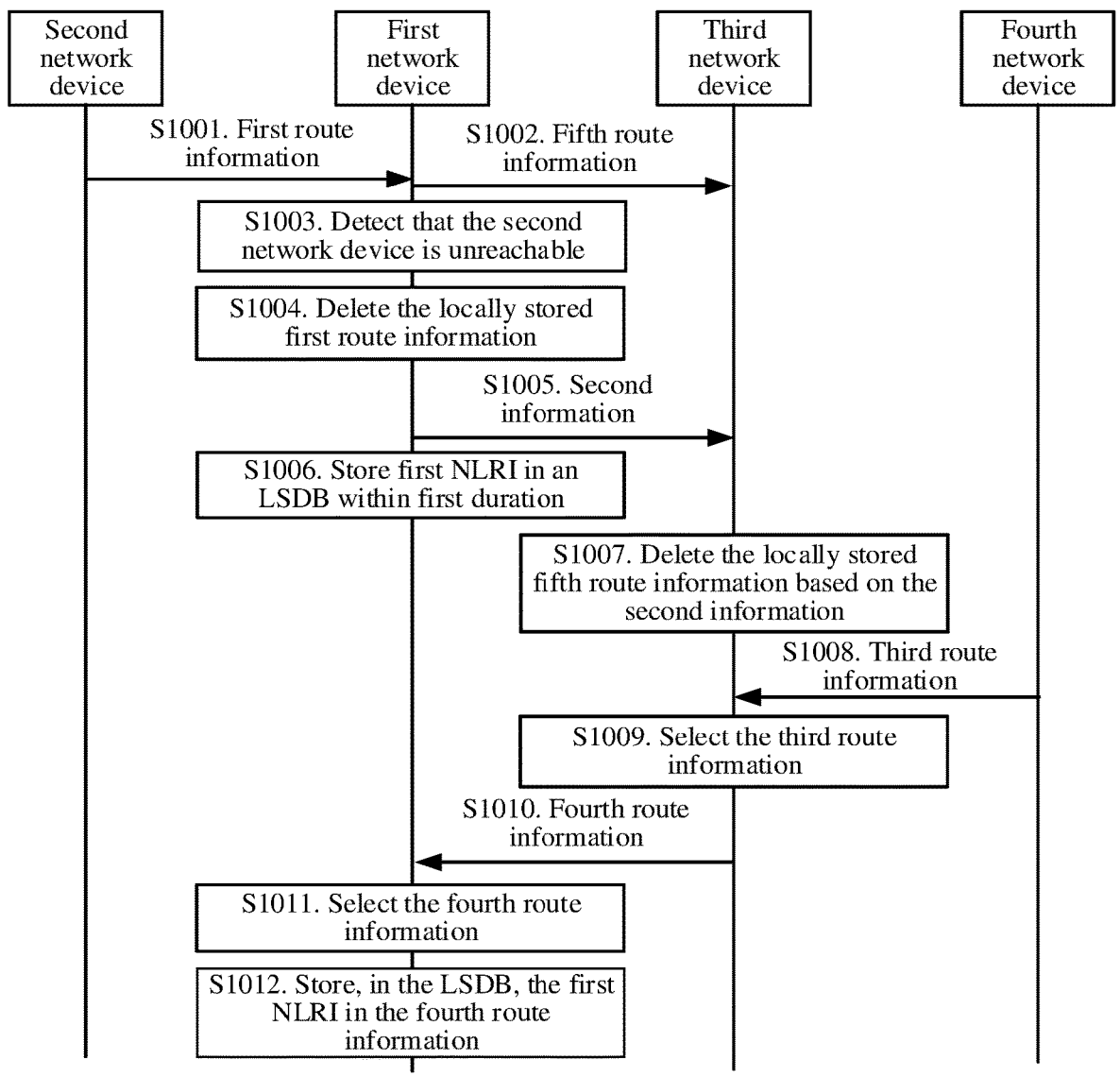

In a possible implementation, the second information in the embodiment corresponding to FIG. 8 may be used to withdraw the previously sent route information. The following describes, through a procedure shown in FIG. 10, detailed steps in the embodiment corresponding to FIG. 8 in this case. Refer to FIG. 10. A route information processing method in this application may include step S1001 to step S1012.

In a possible implementation, for understanding of a first network device to a third network device in the embodiment shown in FIG. 10, respectively refer to the first network device 701 to the third network device 703 in the network shown in FIG. 7. In a possible implementation, first NLRI in the embodiment corresponding to FIG. 10 corresponds to the NLRI-E of the network device E in the embodiment corresponding to FIG. 2, and the second network device, the first network device, and the third network device are respectively the network device D, the network device C, and the network device A in the network shown in FIG. 1 or FIG. 2.

S1001. The second network device sends first route information to the first network device.

For understanding of Step S1001, refer to step S801 in the embodiment corresponding to FIG. 8. Details are not described herein again.

S1002. The first network device sends fifth route information to the third network device.

After receiving the first route information, the first network device may store the first route information in a local input route information base (for example, RIBin), and select the first route information. Then, the first network device may store, in a local LSDB, first NLRI in the first route information, and advertise the selected first route information to the third network device. Specifically, the first network device may send the fifth route information to the third network device based on the first route information. The fifth route information includes the first NLRI. Specifically, the first NLRI may be included in an NLRI field.

S1003. The first network device detects that the second network device and the first network device are unreachable with each other.

For understanding of step S1003, refer to step S802 in the embodiment corresponding to FIG. 8. Details are not described herein again.

S1004. The first network device deletes the locally stored first route information.

After detecting that the second network device and the first network device are unreachable with each other, the first network device may delete the locally stored first route information. Specifically, in a possible implementation, the first network device may delete the first route information from a local input route information base (for example, RIBin). In this embodiment of this application, the first network device is not limited to immediately deleting the first route information after detecting that the second network device and the first network device are unreachable with each other. For example, the first network device may perform step S1004 after specific duration (for example, T in the embodiment corresponding to FIG. 3 or FIG. 6) elapses. However, the duration (for example, T) is less than the first duration in the embodiment corresponding to FIG. 10. In other words, after deleting the first route information in the RIBin, the first network device further needs to store the first route information in the RIB-L.

S1005. The first network device sends second information to the third network device.

In response to deleting the first route information from the input route information base, the first network device may send the second information to the third network device. The second information is used to withdraw the fifth route information previously sent by the first network device to the third network device.

In a possible implementation, the first network device may send an update message to the third network device, and include the second information in the update message, to withdraw the previously sent fifth route information from the third network device.

Specifically, for example, a BGP packet (for example, an update packet or an update message) includes the second information in a withdrawal field, where the second information includes the first NLRI.

S1006. The first network device stores the first NLRI in the LSDB within first duration.

The first network device may store the first NLRI in the LSDB within the first duration that is after the first network device detects that the second network device and the first network device are unreachable with each other.

In a possible implementation, before the first network device receives the fourth route information, the first network device may store the first NLRI in the LSDB by not deleting the first route information in the RIB-L within the first duration.

If the first network device receives the fourth route information within the first duration, the first network device may select the fourth route information, replace the first route information with the fourth route information, store the fourth route information in the RIB-L, and then store, in a local LSDB, the first NLRI in the fourth route information.

After the first duration, if the first network device does not receive the fourth route information, the first network device may delete the first route information in the RIB-L.

S1007. The third network device deletes the locally stored fifth route information based on the second information.

After receiving the second information, the third network device may read the first NLRI in the second information, and then delete the locally stored (for example, stored in a local RIBin) fifth route information.

S1008. A fourth network device sends third route information to the third network device.

In the embodiment corresponding to FIG. 10, step S1008 is not limited to needing to be performed after step S1007. In a possible implementation, step S1008 may be performed before step S1007, or may be performed before step S1005, provided that step S1008 is performed before step S1009.

S1009. The third network device selects the third route information.

Because the fifth route information has been deleted, the third network device may select the received third route information.

S1010. The third network device sends fourth route information to the first network device based on the selected third route information.

S1011. The first network device selects the fourth route information.

S1012. The first network device stores, in the LSDB, the first NLRI in the fourth route information.

For understanding of step S1010 and step S1012, respectively refer to step S806 to step S808 in the embodiment corresponding to FIG. 8. Details are not described herein again.

In the embodiment corresponding to FIG. 10 and the embodiment corresponding to FIG. 8, the same words have the same meaning. Therefore, for understanding of content that is in the embodiment corresponding to FIG. 10 and that is the same as the words in the embodiment corresponding to FIG. 8, refer to the embodiment corresponding to FIG. 8. Details are not described herein again.

With reference to the network shown in FIG. 1, the following describes a possible specific procedure of the method in the embodiment corresponding to FIG. 10. It is assumed that the first NLRI in the embodiment corresponding to FIG. 10 corresponds to the network device E, and the first NLRI is referred to as NLRI-E. It is assumed that the second network device, the first network device, the third network device, and the fourth network device are respectively the network device D, the network device C, the network device A, and the network device B in the network shown in FIG. 1. It is assumed that each network device shown in FIG. 1 supports the extended BGP protocol described in this embodiment of this application.

In a possible implementation, each network device shown in FIG. 1 may advertise, based on the process of the embodiment corresponding to FIG. 2, the NLRI-E until the NLRI-E converges for the first time.

If the NLRI-E stored in each network device in FIG. 1 converges at a moment t0, and at a specific moment (referred to as a moment t1) after t0, the network device C detects that the network device D is unreachable to the network device C, the network device shown in FIG. 1 needs to perform an NLRI exchange process again until the NLRI-E converges after a fault occurs in each network device.

Figure 11:
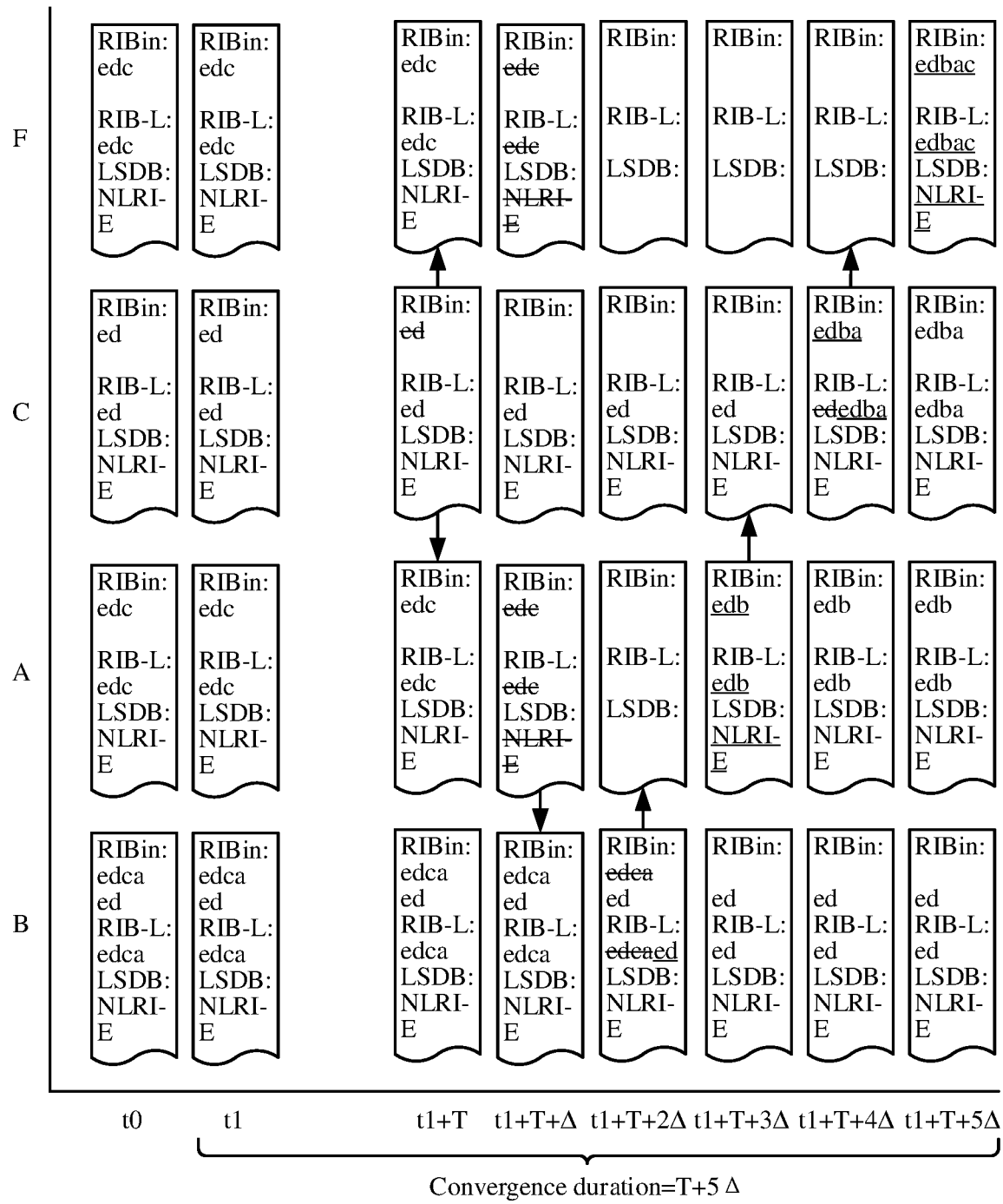
FIG. 11 shows an NLRI exchange process performed by a network device in FIG. 1 according to an embodiment method corresponding to FIG. 10.

FIG. 11 shows an NLRI exchange process performed by the network device in FIG. 1 according to the embodiment corresponding to FIG. 10. In FIG. 11, an underscore at the bottom of text in a text box represents an operation of adding or updating corresponding local information performed by the network device. For understanding of other same content (for example, horizontal axis coordinates, vertical axis coordinates, strikethroughs, line segments with arrows, and text boxes) in FIG. 11 and FIG. 3, refer to related descriptions corresponding to FIG. 3. Details are not described herein again.

It is assumed that the NLRI-E stored by each network device in FIG. 1 converges at the moment t0. For stored information related to the NLRI-E, refer to content in a text box corresponding to t0 in FIG. 11.

At a moment t1, the network device C detects that the network device D is unreachable to the network device C, and the network device C starts a timer 1 (not shown in FIG. 11). It is assumed that duration of the timer 1 is set to T, and locally stored NLRI-E-related information is stored before the timer 1 expires, to be specific, ed is stored in the RIBin. Correspondingly, ed may be stored in the RIB-L, and NLRI-E may be stored in the LSDB.

At a moment t1+T, the network device C deletes ed in the RIBin, but does not delete ed in the RIB-L. Correspondingly, NLRI-E may be stored in the LSDB. Then, the network device C separately sends, to the network device A and the network device F, withdrawal information (referred to as edc') for withdrawing the previously sent edc.

Similar to the embodiment corresponding to FIG. 3, because duration for advertising route information between different network devices is usually not greatly different, for ease of description, in the embodiment corresponding to FIG. 11, it is assumed that duration required for advertising route information between network devices is the same, and Δ is used to represent the duration. Compared with the duration required for advertising route information between network devices, duration required for an operation of deleting or adding locally stored information performed by the network device is usually short. Therefore, to facilitate description of an NLRI exchange process performed by the network device again, in FIG. 11, a plurality of operations with short intervals correspond to a same moment. However, in this embodiment of this application, the plurality of operations corresponding to a same moment in FIG. 11 are not limited to needing to be performed simultaneously.

At a moment t1+T+Δ, it is assumed that both the network device A and the network device F receive edc' from the network device C. Both the network device A and the network device F delete edc from the local RIBin, correspondingly continue to delete edc from the local RIB-L, and delete the NLRI-E from the local LSDB. In addition, after deleting edc from the local RIB-L, the network device A may send, to the network device B, withdrawal information edca' for withdrawing edca.

At a moment t1+T+2Δ, it is assumed that the network device B receives edca' from the network device A. The network device B deletes edca from the local RIBin, and correspondingly continues to delete edca from the local RIB-L. Because the local RIBin further stores ed, the network device B selects ed, stores ed in the local RIB-L, and stores, in the LSDB, the NLRI-E and the like in ed. After storing ed in the local RIB-L, the network device B may advertise the selected ed to the network device A. Based on a reason similar to that described in S1.2, in this embodiment of this application, ed advertised by the network device B to the network device A is referred to as edb.

At a moment t1+T+3Δ, it is assumed that the network device A receives edb from the network device B. The network device A stores edb in the local RIBin, selects edb, stores edb in the local RIB-L, and then stores, in the LSDB, the NLRI-E and the like in edb. After storing edb in the local RIB-L, the network device A may advertise edb to the network device C. Based on a reason similar to that described in S1.2, in this embodiment of this application, edb advertised by the network device A to the network device C is referred to as edba.

At a moment t1+T+4Δ, it is assumed that the network device C receives edba from the network device A. The network device C stores edba in the local RIBin, selects edba, replaces ed with edba, and stores edba in the local RIB-L, and then stores, in the LSDB, the NLRI-E and the like in edba. After storing edba in the local RIB-L, the network device C may advertise edba to the network device F. Based on a reason similar to that described in S1.2, in this embodiment of this application, edba advertised by the network device C to the network device F is referred to as edbac.

At a moment t1+T+5Δ, it is assumed that the network device F receives edbac from the network device C. The network device A stores edbac in the local RIBin, selects edbac, stores edbac in the local RIB-L, and then stores, in the LSDB, the NLRI-E and the like in edbac.

The NLRI-E stored by the network device B, the network device A, the network device C, and the network device F converges at the moment t1+T+5Δ. In a convergence process, if the first duration in the embodiment corresponding to FIG. 10 is greater than T+4Δ, a reachable link always exists between the network device C and the network device E, to calculate a packet forwarding path to the network device E.

The foregoing describes the route information processing method in embodiments of this application, and the following describes a structure of a network device in this application. The network device may be the first network device or the second network device in the method in the embodiment shown in FIG. 5, the network device C or the network device A in the method in the embodiment shown in FIG. 6, the first network device or the third network device in the method in the embodiment shown in FIG. 8, the first network device or the third network device in the method in the embodiment shown in FIG. 9, the first network device or the third network device in the method in the embodiment shown in FIG. 10, or the network device C or the network device A in the method in the embodiment shown in FIG. 11. Alternatively, the network device may be an apparatus that can be used in a matching manner with a corresponding device. The network device may be installed in a corresponding device. For example, the network device may be a chip system. In this embodiment of this application, the chip system may include a chip, or may include a chip and another discrete component.

Figure 12:
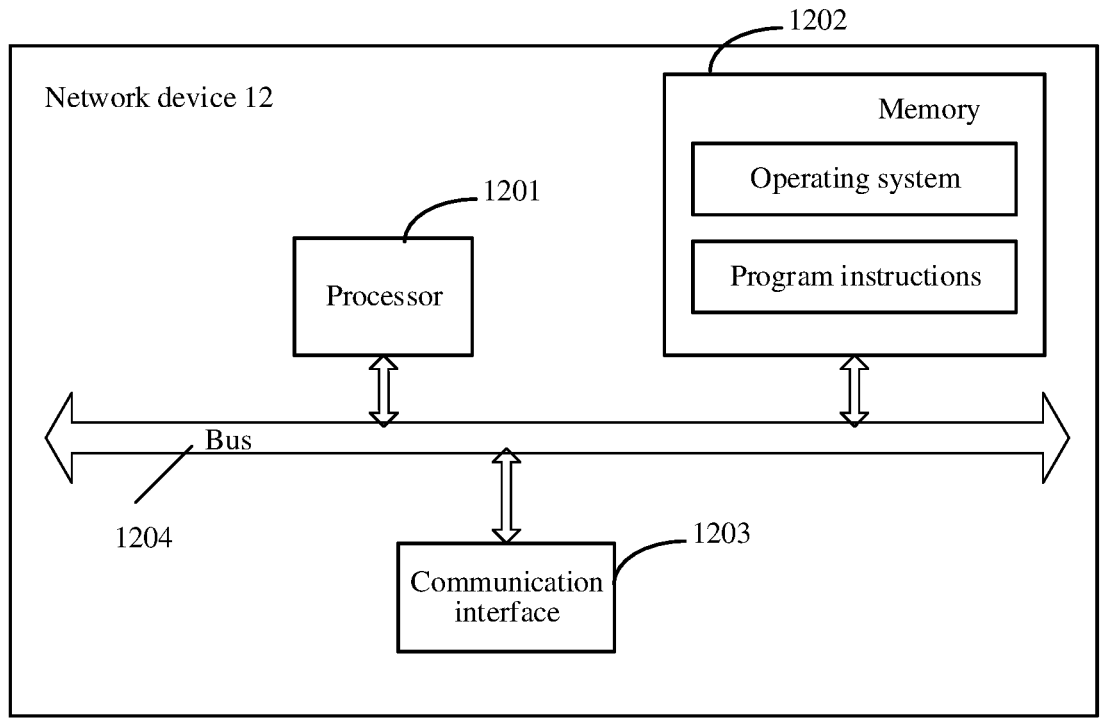
FIG. 12 to FIG. 16 each are a schematic diagram of a possible structure of a network device according to an embodiment of this application.

FIG. 12 is a schematic diagram of a structure of a network device according to an embodiment of this application. Refer to FIG. 12. The network device 12 includes a processor 1201 and a memory 1202.

The processor 1201 may be one or more CPUs, and the CPU may be a single-core CPU, or may be a multi-core CPU.

The memory 1202 includes but is not limited to a random access memory (random access memory, RAM), a read-only memory (ROM), an erasable programmable read-only memory (EPROM, or a flash memory), a flash memory, an optical memory, or the like. The memory 1202 stores an operating system and code of program instructions.

Optionally, the network device 12 further includes a communication interface 1203. The communication interface 1203 may be a wired interface, for example, a fiber distributed data interface (FDDI) or a gigabit ethernet (GE) interface. The communication interface 1203 may also be a wireless interface. The communication interface 1203 is configured to receive route information sent by a BGP neighbor.

Optionally, the network device 12 further includes a bus 1204. The foregoing processor 1201 and the memory 1202 are usually connected to each other through the bus 1204, or may be connected to each other in another manner.

Optionally, the processor 1201 implements the route information processing method in this embodiment of this application by reading the program instructions stored in the memory 1202. Alternatively, the processor 1201 may implement the route information processing method in this embodiment of this application by using internally stored program instructions. For example, the processor 1201 performs, based on the instructions stored in the memory 1202, the steps performed by the first network device or the second network device in the method in the embodiment shown in FIG. 5, performs the steps performed by the network device C or the network device A in the method in the embodiment shown in FIG. 6, performs the steps performed by the first network device or the third network device in the method in the embodiment shown in FIG. 8, performs the steps performed by the first network device or the third network device in the method in the embodiment shown in FIG. 8, performs the steps performed by the first network device or the third network device in the method in the embodiment shown in FIG. 9, performs the steps performed by the first network device or the third network device in the method in the embodiment shown in FIG. 10, or performs the steps performed by the network device C or the network device A in the method in the embodiment shown in FIG. 11. For more details of implementing the foregoing steps by the processor 1201, refer to the descriptions in the methods in the foregoing embodiments. Details are not described herein again.

Figure 13:
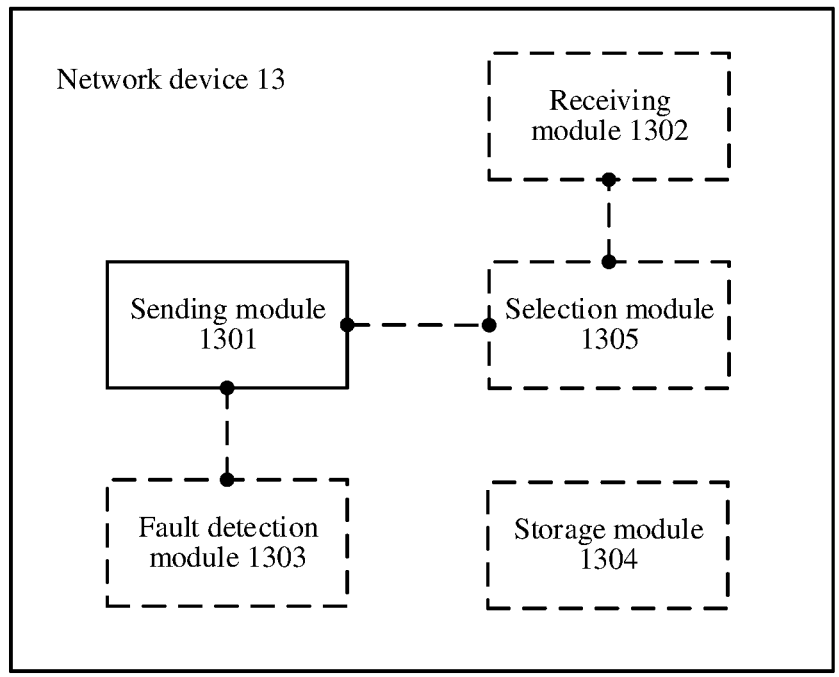

An embodiment of this application further provides a network device. FIG. 13 is a schematic diagram of a structure of a network device according to an embodiment of this application. Refer to FIG. 13. The network device 13 includes a sending module 1301. For example, the sending module 1301 is configured to perform step S501 or step 509. The network device 13 may further include a receiving module 1302. For example, the receiving module 1302 is configured to perform step S506 or step S504. The network device 13 may further include a fault detection module 1303. For example, the fault detection module may be configured to perform step S508. The network device 13 may further include a storage module 1304. For example, the storage module 1304 may be configured to perform step S505 or step S510. The storage module 1304 may be connected to one or more modules in the network device 13. For brevity of FIG. 13, a connection line between the storage module 1304 and another module is not shown in the network device 13 shown in FIG. 13. The network device may further include a selection module 1305. For example, the selection module 1305 may be configured to perform step S507. For a specific execution process, refer to detailed descriptions of corresponding steps in the foregoing method embodiments. Details are not described herein again.

Figure 14:
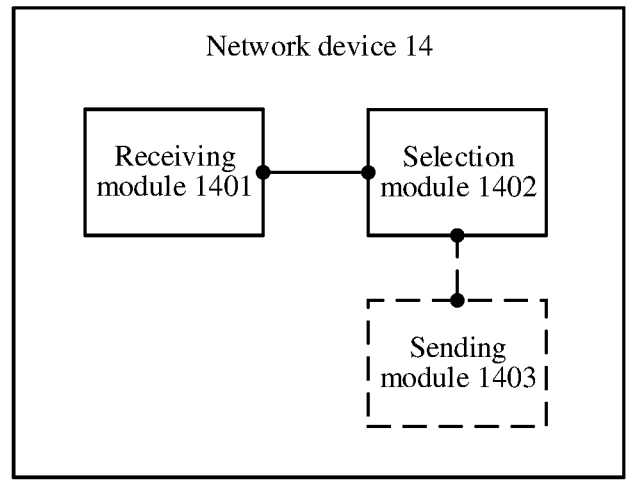

An embodiment of this application further provides a network device. FIG. 14 is a schematic diagram of a structure of a network device according to an embodiment of this application. Refer to FIG. 14. The network device 14 includes a receiving module 1401 and a selection module 1402. For example, the receiving module 1401 is configured to perform step S501, step S502, or step S509. For example, the selection module 1402 is configured to perform step S503. The network device 14 may further include a sending module 1403. For example, the sending module 1403 is configured to perform step S506. For a specific execution process, refer to detailed descriptions of corresponding steps in the foregoing method embodiments. Details are not described herein again.

Figure 15:
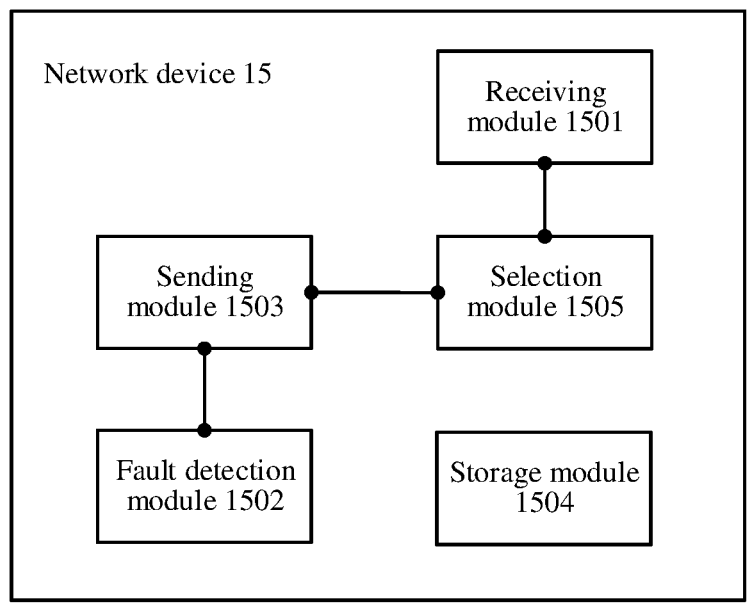

An embodiment of this application further provides a network device. FIG. 15 is a schematic diagram of a structure of a network device according to an embodiment of this application. Refer to FIG. 15. The network device 15 includes a receiving module 1501, a fault detection module 1502, a sending module 1503, and a storage module 1504. For example, the receiving module 1501 may be configured to perform step S801, step S806, step S901, step S909, step S1001, or step S1010. For example, the fault detection module 1502 is configured to perform step S802, step S903, or step S1003. For example, the sending module 1503 is configured to perform step S803, step S902, step S905, step S1002, or step S1005. For example, the storage module 1504 is configured to perform step S804, step S808, step S904, step S906, step S911, step S912, step S913, step S1004, step S1006, or step S1012. The storage module 1504 may be connected to one or more modules in the network device 15. For brevity of FIG. 15, a connection line between the storage module 1504 and another module is not shown in the network device 15 shown in FIG. 15. In a possible implementation, the network device 15 further includes a selection module 1505. For example, the selection module 1505 is configured to perform step S807, step S910, or step S1011. For a specific execution process, refer to detailed descriptions of corresponding steps in the foregoing method embodiments. Details are not described herein again.

Figure 16:
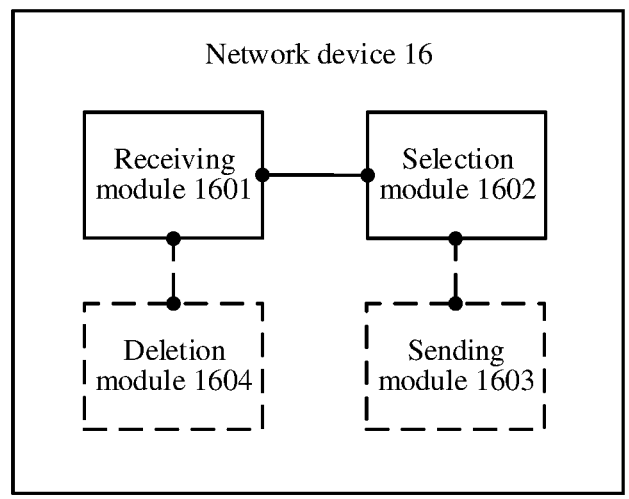

An embodiment of this application further provides a network device. FIG. 16 is a schematic diagram of a structure of a network device according to an embodiment of this application. Refer to FIG. 16. The network device 16 includes a receiving module 1601 and a selection module 1602. For example, the receiving module 1601 may be configured to perform step S803, step S803, step S902, step S905, step S907, step S1002, step S1005, or step S1008. For example, the selection module 1602 is configured to perform step S805, step S908, or step S1009. In a possible implementation, the network device 16 may further include a sending module 1603. For example, the sending module 1603 is configured to perform step S806, step S909, or step S1010. In a possible implementation, the network device 16 may further include a deletion module 1604. For example, the deletion module 1604 is configured to perform step S1007. For a specific execution process, refer to detailed descriptions of corresponding steps in the foregoing method embodiments. Details are not described herein again.

The coupling in this embodiment of this application may be an indirect coupling or a communication connection between apparatuses, units, or modules, may be implemented in an electrical form, a mechanical form, or another form, and is used for information exchange between the apparatuses, the units, or the modules.

The apparatus embodiments described in FIG. 13 to FIG. 16 are merely examples. The modules in FIG. 13 to FIG. 16 may be implemented in a form of hardware, or may be implemented in a form of a software function unit. The network device 13 shown in FIG. 13 is used as an example. When software is used for implementation, the sending module 1301 in the network device shown in FIG. 13 may be implemented by one or more software function modules generated after the processor 1201 reads the program instructions stored in the memory 1202. Module division in embodiments of this application is an example, and is merely logical function division. There may be another division manner in an actual implementation. The modules in FIG. 13 to FIG. 16 may also be respectively implemented by different hardware in the network device. For example, the network device 14 shown in FIG. 14 is used as an example. The receiving module 1401 is implemented by the communication interface 1203 in FIG. 12, and the selection module 1402 is implemented by the processor 1201 in FIG. 12. Apparently, the foregoing function modules may also be implemented through a combination of software and hardware. For example, the receiving module 1401 is implemented by the communication interface 1203, and the selection module 1402 is a software function module generated after the processor 1201 reads the program instructions stored in the memory 1202.

For technical effects that can be implemented by the network device shown in FIG. 13 to FIG. 16 and more details of implementing the foregoing functions by the modules, refer to corresponding descriptions in the foregoing method embodiments. Details are not described herein again.

Figure 17:
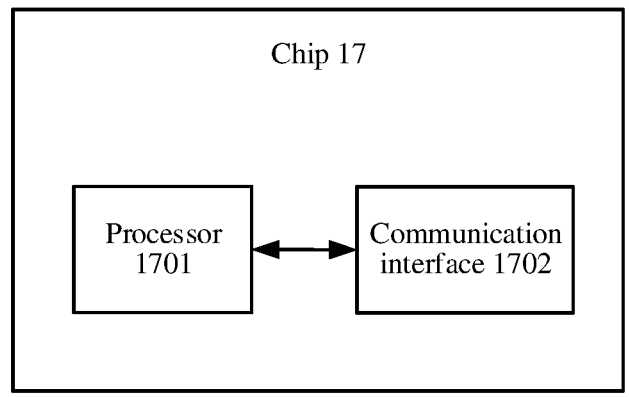
FIG. 17 is a schematic diagram of a possible structure of a chip according to an embodiment of this application.

Refer to FIG. 17. An embodiment of this application further provides a chip 17. The chip 17 includes a processor 1701 and a communication interface 1702. The communication interface 1702 is coupled to the processor 1701. The processor 1701 is configured to run a computer program or instructions, to implement the method provided in any one of the foregoing method embodiments of this application.

In an example, the communication interface 1702 (or referred to as an interface circuit) may be, for example, an input/output interface, a pin, or a circuit on the chip 17. The processor 1701 may execute computer instructions stored in a memory, so that the chip 17 performs any one of the foregoing method embodiments. Optionally, the memory may be a storage unit in the chip 17, for example, a register or a cache, or the memory may be a memory that is in a computer device and that is located outside the chip 17, for example, a read-only memory (ROM), another type of static storage device that can store static information and instructions, or a random access memory (RAM). Optionally, the processor 1701 may be a general-purpose central processing unit (CPU), a microprocessor, an application-specific integrated circuit (ASIC), or one or more integrated circuits configured to control program execution of any one of the foregoing method embodiments.

All or a part of the foregoing embodiments may be implemented by software, hardware, firmware, or any combination thereof. When software is used to implement embodiments, all or a part of embodiments may be implemented in a form of a computer program product.

The computer program product includes one or more computer instructions. When computer-executable instructions are loaded and executed on a computer, the procedures or functions described according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by the computer, or a data storage device, such as a server or a data center, integrating one or more available media. The usable medium may be a magnetic medium (for example, a floppy disk, a hard disk, or a magnetic tape), an optical medium (for example, a DVD), a semiconductor medium (for example, a solid-state drive (SSD)), or the like.

An embodiment of this application further provides a network (or referred to as a communication system). The network may include a first network device and a second network device. The first network device and the second network device are respectively configured to perform the steps performed by corresponding network devices in the method in the embodiment shown in FIG. 5.

An embodiment of this application further provides a network (or referred to as a communication system). The network includes a first network device, a second network device, and a third network device. The first network device, the second network device, and the third network device are configured to respectively perform the steps performed by corresponding network devices in the method in the embodiment shown in FIG. 8, FIG. 9, or FIG. 1.

In embodiments of this application, at least one means one or more, and a plurality of means two or more. This is not limited in this application. In embodiments of this application, "/" may represent an "or" relationship between associated objects. For example, A/B may represent A or B. "and/or" may be used to indicate that there are three relationships between associated objects. For example, A and/or B may represent the following three cases: Only A exists, both A and B exist, and only B exists, where A and B may be singular or plural. For ease of describing the technical solutions in embodiments of this application, in the embodiments of this application, words such as "first" and "second" may be used to distinguish technical features with a same or similar function. The words such as "first" and "second" do not limit a quantity and an execution sequence, and the words such as "first" and "second" do not limit a definite difference. In embodiments of this application, the word such as "example" or "for example" is used to represent an example, evidence, or a description. Any embodiment or design solution described as "example" or "for example" should not be explained as being more preferred or having more advantages than another embodiment or design solution. A word such as "example" or "for example" is used to present a related concept in a specific manner for ease of understanding.

The embodiments in this specification are all described in a progressive manner, mutual reference may be made to the same or similar part of the embodiments, and each embodiment focuses on illustrating a difference from other embodiments. In particular, for the system embodiment, since it is basically similar to the method embodiment, the apparatus embodiment is described simply, and the relevant part may be obtained with reference to the part of the description of the method embodiment.

A person of ordinary skill in the art may understand that when software is used to implement each aspect of embodiments of this application or the possible implementations of each aspect, all or some of the foregoing aspects or the possible implementations of each aspect may be implemented in a form of a computer program product. The computer program product refers to computer-readable instructions stored in a computer-readable medium. When the computer instructions are loaded and executed on a computer, the procedures or functions described according to embodiments of this application are all or partially generated.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any appropriate combination thereof. For example, the computer-readable storage medium is a random access memory (RAM), a read-only memory (ROM), an erasable programmable read-only memory (EPROM), or a portable read-only memory (CD-ROM).

Apparently, a person skilled in the art can make various modifications and variations to the present invention without departing from the scope of the present invention. In this way, if the modifications and variations made to this application fall within the scope of the claims of the present invention, the present invention is intended to include these modifications and variations.

What is claimed is:

1. A first network device comprising:
   one or more memories storing instructions; and
   one or more processors coupled to the one or more memories and configured to execute the instructions to cause the first network device to:
      receive first route information from a second network device in a network with the first network device, wherein the first network device is connected to the second network device through a first link, wherein a first border gateway protocol (BGP) neighbor relationship is established between the first network device and the second network device, and wherein the first route information comprises first network layer reachability information (NLRI) of a target network;
      based on detecting that the second network device and the first network device cannot reach one another, send second information to a third network device, wherein a second BGP neighbor relationship is established between the first network device and the third network device, wherein the second information indicates to the third network device that the third network device is to select third route information used to calculate a route to the target network, and wherein an advertisement path from the third route information to the third network device avoids passing through the first link; and
      store the first NLRI in a local link state database (LSDB) within a first duration after sending the second information, wherein the first NLRI is used to calculate a route from a local network to the target network.

2. The first network device according to claim 1, wherein the third route information comprises the first NLRI.

3. The first network device according to claim 2, wherein the second information comprises the first NLRI.

4. The first network device according to claim 3, wherein the one or more processors further cause the first network device to:
receive fourth route information from the third network device, wherein the fourth route information is sent by the third network device based on the third route information, and wherein the fourth route information comprises the first NLRI.

5. The first network device according to claim 4, wherein the one or more processors further cause the first network device to:
select the fourth route information, wherein the fourth route information is used to calculate the route to the target network; and
store the first NLRI in the fourth route information in the LSDB.

6. The first network device according to claim 1, wherein the second information further comprises a second priority attribute, wherein the third route information further comprises a third priority attribute, wherein the second priority attribute indicates a priority of the second information, wherein the third priority attribute indicates a priority of the third route information, and wherein the priority indicated by the second priority attribute in the second information is lower than the priority indicated by the third priority attribute.

7. The first network device according to claim 6, wherein the first route information further comprises a first priority attribute, wherein the first priority attribute indicates a priority of the first route information, and wherein the priority indicated by the second priority attribute is lower than the priority indicated by the first priority attribute.

8. The first network device according to claim 7, wherein, based on the first network device detecting that the second network device and the first network device cannot reach one another, the one or more processors further cause the first network device to:
modify the second priority attribute into the first priority attribute in the first route information stored locally.

9. The first network device according to claim 8, wherein the one or more processors further cause the first network device to:
based on detecting that the second network device and the first network device cannot reach one another after the first duration elapses, delete the first route information stored locally.

10. The first network device according to claim 9, wherein the one or more processors further cause the first network device to:
based on detecting that between the first network device and the second network device is restored within the first duration, modify, after a second duration elapses, the second priority attribute into the first priority attribute in the first route information stored locally.

11. The first network device according to claim 1, wherein the one or more processors further cause the first network device to:
send fifth route information to the third network device based on the first route information,
wherein the second information is utilized to withdraw the fifth route information from the third network device.

12. The first network device according to claim 11, wherein the one or more processors further cause the first network device to:
delete the locally stored first route information.

13. The first network device according to claim 1, wherein the one or more processors further cause the first network device to:
detect that a fault occurs on the second network device;
detect that a fault occurs on the first link; or
detect that a fault occurs on a local port corresponding to the first link.

14. The first network device according to claim 1, wherein the first NLRI comprises:
a node NLRI,
a link NLRI, or
a topology prefix NLRI.

15. A network device comprising:
one or more memories storing instructions; and
one or more processors coupled to the one or more memories and configured to execute the instructions to cause the network device to:
receive first information from a first network device in a network with the network device, wherein a border gateway protocol (BGP) neighbor relationship is established between the first network device and the network device, wherein the first information comprises first network layer reachability information (NLRD of a target network and a first priority attribute, and wherein the first priority attribute indicates a priority of the first information; and
select second route information from second information and the second route information based on the first priority attribute and a second priority attribute,
wherein the second route information is used to calculate a route to the target network, wherein the second route information comprises the first NLRI and the second priority attribute, wherein the second priority attribute indicates a priority of the second route information, and wherein the priority indicated by the first priority attribute is lower than the priority indicated by the second priority attribute.

16. A system comprising:
a first network device;
a second network device; and
a third network device,
wherein the first network device is configured to:
receive first route information from the second network device,
wherein the first network device is connected to the second network device through a first link, wherein a first border gateway protocol (BGP) neighbor relationship is established between the first network device and the second network device, and wherein the first route information comprises first network layer reachability information (NLRI) of a first target network;
based on detecting that the second network device and the first network device cannot reach one another, send second information to the third network device,
wherein a second BGP neighbor relationship is established between the first network device and the third network device, wherein the second information causes the third network device to select third route information to calculate a route to the first target network, and wherein an advertisement path from the third route information to the third network device avoids passing through the first link; and store the first NLRI in a local link state database (LSDB) within a first duration after sending the second information, wherein the first NLRI is used to calculate a route from a local network to the first target network, wherein the third network device is configured to:
  receive the second information from the first network device,
    wherein a third BGP neighbor relationship is established between the first network device and the third network device, wherein the second information comprises second NLRI of a second target network and a second priority attribute, and wherein the second priority attribute indicates a priority of the second information; and
  select third route information from the second information and the third route information,
    wherein the third route information is selected based on the second priority attribute and a third priority attribute, wherein the third route information is used to calculate a route to the second target network, wherein the third route information comprises the first NLRI and the third priority attribute, wherein the third priority attribute indicates a priority of the third route information, and wherein the priority indicated by the second priority attribute is lower than the priority indicated by the third priority attribute.

17. The system according to claim 16, wherein the third route information comprises the first NLRI.

18. The system according to claim 17, wherein the second information comprises the first NLRI.

19. The system according to claim 18, wherein the first network device is further configured to:
  receive fourth route information from the third network device,
    wherein the fourth route information is sent by the third network device based on the third route information, and wherein the fourth route information comprises the first NLRI.

20. The system according to claim 19, wherein the first network device is further configured to:
  select the fourth route information, wherein the fourth route information is used to calculate a route to the first target network; and
  store the first NLRI in the fourth route information in the LSDB.

* * * * *